(12) United States Patent
Zagars et al.

(10) Patent No.: US 11,611,061 B2
(45) Date of Patent: Mar. 21, 2023

(54) ELECTROCHEMICAL CELLS HAVING SEMI-SOLID ELECTRODES AND METHODS OF MANUFACTURING THE SAME

(71) Applicant: 24M Technologies, Inc., Cambridge, MA (US)

(72) Inventors: Raymond Zagars, Quincy, MA (US); Jeffrey Curhan, Warwick, RI (US); Tristan Doherty, Somerville, MA (US); Alexander H. Slocum, Bow, NH (US)

(73) Assignee: 24M Technologies, Inc., Cambridge, MA (US)

( * ) Notice: Subject to any disclaimer, the term of this patent is extended or adjusted under 35 U.S.C. 154(b) by 0 days.

(21) Appl. No.: 17/109,686

(22) Filed: Dec. 2, 2020

(65) Prior Publication Data

US 2021/0167351 A1  Jun. 3, 2021

Related U.S. Application Data

(63) Continuation of application No. 16/821,241, filed on Mar. 17, 2020, now Pat. No. 10,886,521, which is a (Continued)

(51) Int. Cl.
*H01M 4/02* (2006.01)
*H01M 4/04* (2006.01)
(Continued)

(52) U.S. Cl.
CPC ............ *H01M 4/02* (2013.01); *H01M 4/0404* (2013.01); *H01M 4/0407* (2013.01);
(Continued)

(58) Field of Classification Search
CPC ............ H01M 4/02; H01M 4/04; H01M 4/14; H01M 10/0585; H01M 10/04; H01M 50/557
See application file for complete search history.

(56) References Cited

U.S. PATENT DOCUMENTS 2,208,028 A   7/1940  Harrington
3,624,628 A   11/1971 Schmidt
(Continued)

FOREIGN PATENT DOCUMENTS

CN   1333929 A    1/2002
CN   1354529      6/2002
(Continued)

OTHER PUBLICATIONS

Office Action for U.S. Appl. No. 13/607,021, dated Apr. 20, 2015, 8 pages.
(Continued)

*Primary Examiner* — Kenneth J Douyette
(74) *Attorney, Agent, or Firm* — Cooley LLP

(57) ABSTRACT

Embodiments described herein relate generally to electrochemical cells having semi-solid electrodes that are coated on only one side of a current collector. In some embodiments, an electrochemical cell includes a semi-solid positive electrode coated on only one side of a positive current collector and a semi-solid negative electrode coated on only one side of a negative current collector. A separator is disposed between the semi-solid positive electrode and the semi-solid negative electrode. At least one of the semi-solid positive electrode and the semi-solid negative electrode can have a thickness of at least about 250 μm.

15 Claims, 13 Drawing Sheets

Related U.S. Application Data continuation of application No. 14/932,153, filed on Nov. 4, 2015, now Pat. No. 10,637,038.

(60) Provisional application No. 62/075,373, filed on Nov. 5, 2014.

(51) Int. Cl.

| | | |
|---|---|---|
| *H01M 4/36* | (2006.01) | |
| *H01M 4/139* | (2010.01) | |
| *H01M 10/04* | (2006.01) | |
| *H01M 50/557* | (2021.01) | |
| *H01M 10/0585* | (2010.01) | |

(52) U.S. Cl.
CPC ....... *H01M 4/0409* (2013.01); *H01M 4/0473* (2013.01); *H01M 4/36* (2013.01); *H01M 10/049* (2013.01); *H01M 10/0413* (2013.01); *H01M 10/0436* (2013.01); *H01M 10/0585* (2013.01); *H01M 50/557* (2021.01); *H01M 4/139* (2013.01); *H01M 2004/021* (2013.01); *H01M 2220/30* (2013.01)

(56) References Cited

U.S. PATENT DOCUMENTS

| | | | |
|---|---|---|---|
| 3,982,966 | A * | 9/1976 | Beatty .................. H01M 6/12 429/136 |
| 4,080,728 | A | 3/1978 | Buckler |
| 4,105,815 | A | 8/1978 | Buckler |
| 4,199,912 | A | 4/1980 | James, Jr. et al. |
| 4,386,019 | A | 5/1983 | Kann et al. |
| 4,623,598 | A | 11/1986 | Waki et al. |
| 4,695,355 | A | 9/1987 | Koziol |
| 4,818,643 | A | 4/1989 | Cook et al. |
| 4,925,752 | A | 5/1990 | Fauteux et al. |
| 5,316,556 | A | 5/1994 | Morris |
| 5,582,931 | A | 12/1996 | Kawakami |
| 5,603,770 | A | 2/1997 | Sato |
| 5,612,152 | A | 3/1997 | Bates |
| 5,674,556 | A | 10/1997 | Fukumura et al. |
| 5,697,145 | A | 12/1997 | Fukumura et al. |
| 5,725,822 | A | 3/1998 | Keller et al. |
| 5,749,927 | A | 5/1998 | Chern et al. |
| 5,792,576 | A | 8/1998 | Xing et al. |
| 5,834,052 | A | 11/1998 | Fukumura et al. |
| 5,837,397 | A | 11/1998 | Xing |
| 6,207,322 | B1 | 3/2001 | Kelsey et al. |
| 6,264,707 | B1 | 7/2001 | Ishikawa et al. |
| 6,284,192 | B1 | 9/2001 | Coonan et al. |
| 6,287,722 | B1 | 9/2001 | Barton et al. |
| 6,291,091 | B1 | 9/2001 | Preischl et al. |
| 6,296,967 | B1 | 10/2001 | Jacobs et al. |
| 6,296,971 | B1 | 10/2001 | Hara |
| 6,306,215 | B1 | 10/2001 | Larkin |
| 6,368,365 | B1 | 4/2002 | Chi et al. |
| 6,403,262 | B1 | 6/2002 | Xing et al. |
| 6,461,757 | B1 | 10/2002 | Sasayama et al. |
| 6,503,432 | B1 | 1/2003 | Barton et al. |
| 6,503,657 | B1 | 1/2003 | Takami et al. |
| 6,576,365 | B1 | 6/2003 | Meitav et al. |
| 6,589,299 | B2 | 7/2003 | Missling et al. |
| 6,803,145 | B1 | 10/2004 | von During |
| 6,939,383 | B2 | 9/2005 | Eastin et al. |
| 6,986,967 | B2 | 1/2006 | Barton et al. |
| 7,022,391 | B2 | 4/2006 | Kawai et al. |
| 7,041,380 | B2 | 5/2006 | Yamashita et al. |
| 7,338,734 | B2 | 3/2008 | Chiang et al. |
| 7,524,577 | B2 | 4/2009 | Bates |
| 7,700,019 | B2 | 4/2010 | Lavoie et al. |
| 7,846,575 | B2 | 12/2010 | Heller, Jr. et al. |
| 8,722,226 | B2 | 5/2014 | Chiang et al. |
| 8,722,227 | B2 | 5/2014 | Chiang et al. |
| 8,778,552 | B2 | 7/2014 | Chiang et al. |
| 8,993,159 | B2 | 3/2015 | Chiang et al. |
| 9,153,833 | B2 | 10/2015 | Chiang et al. |
| 9,178,200 | B2 | 11/2015 | Bazzarella et al. |
| 9,184,464 | B2 | 11/2015 | Chiang et al. |
| 9,203,092 | B2 | 12/2015 | Slocum et al. |
| 9,293,781 | B2 | 3/2016 | Chiang et al. |
| 9,362,583 | B2 | 6/2016 | Chiang et al. |
| 9,385,392 | B2 | 7/2016 | Chiang et al. |
| 9,401,501 | B2 | 7/2016 | Bazzarella et al. |
| 9,437,864 | B2 | 9/2016 | Tan et al. |
| 9,484,569 | B2 | 11/2016 | Doherty et al. |
| 9,583,780 | B2 | 2/2017 | Chiang et al. |
| 9,614,231 | B2 | 4/2017 | Carter et al. |
| 9,786,944 | B2 | 10/2017 | Chiang et al. |
| 9,812,674 | B2 | 11/2017 | Bazzarella et al. |
| 9,825,280 | B2 | 11/2017 | Chiang et al. |
| 9,831,518 | B2 | 11/2017 | Chiang et al. |
| 9,831,519 | B2 | 11/2017 | Chiang et al. |
| 9,831,522 | B2 | 11/2017 | Tan et al. |
| 10,115,970 | B2 | 10/2018 | Ota et al. |
| 10,122,044 | B2 | 11/2018 | Tan et al. |
| 10,153,651 | B2 | 12/2018 | Taylor et al. |
| 10,181,587 | B2 | 1/2019 | Ota et al. |
| 10,230,128 | B2 | 3/2019 | Chiang et al. |
| 10,236,518 | B2 | 3/2019 | Chiang et al. |
| 10,411,310 | B2 | 9/2019 | Chiang et al. |
| 10,483,582 | B2 | 11/2019 | Chiang et al. |
| 10,497,935 | B2 | 12/2019 | Ota et al. |
| 10,522,870 | B2 | 12/2019 | Tan et al. |
| 10,566,581 | B2 | 2/2020 | Bazzarella et al. |
| 10,566,603 | B2 | 2/2020 | Slocum et al. |
| 10,593,952 | B2 | 3/2020 | Ota et al. |
| 10,601,239 | B2 | 3/2020 | Taylor et al. |
| 10,637,038 | B2 | 4/2020 | Zagars et al. |
| 10,734,672 | B2 | 8/2020 | Chen et al. |
| 10,777,852 | B2 | 9/2020 | Woodford et al. |
| 10,854,869 | B2 | 12/2020 | Bazzarella et al. |
| 10,886,521 | B2 | 1/2021 | Zagars et al. |
| 10,910,858 | B2 | 2/2021 | Taylor et al. |
| 11,309,531 | B2 | 4/2022 | Slocum et al. |
| 11,342,567 | B2 | 5/2022 | Chiang et al. |
| 11,462,722 | B2 | 10/2022 | Aranami et al. |
| 11,469,065 | B2 | 10/2022 | Lawrence et al. |
| 2001/0012588 | A1 | 8/2001 | Kaido et al. |
| 2001/0021471 | A1 | 9/2001 | Xing et al. |
| 2002/0106561 | A1 | 8/2002 | Lee et al. |
| 2003/0071337 | A1 | 4/2003 | Mitani et al. |
| 2003/0116556 | A1 | 6/2003 | Li |
| 2003/0116881 | A1 | 6/2003 | Nelson et al. |
| 2003/0205835 | A1 | 11/2003 | Eastin et al. |
| 2004/0029001 | A1 | 2/2004 | Yamazaki et al. |
| 2004/0029008 | A1 | 2/2004 | Winterberg et al. |
| 2004/0029311 | A1 | 2/2004 | Snyder et al. |
| 2004/0131934 | A1 | 7/2004 | Sugnaux et al. |
| 2004/0264110 | A1 | 12/2004 | Michel et al. |
| 2005/0037262 | A1 | 2/2005 | Vallee et al. |
| 2005/0064270 | A1 | 3/2005 | Marionowski |
| 2005/0214648 | A1 | 9/2005 | Boulton et al. |
| 2006/0046137 | A1 | 3/2006 | Kodama |
| 2006/0057433 | A1 | 3/2006 | Ando et al. |
| 2007/0034251 | A1 | 2/2007 | Jonczyk et al. |
| 2008/0096110 | A1 | 4/2008 | Bito et al. |
| 2008/0289676 | A1 | 11/2008 | Guidotti et al. |
| 2009/0023041 | A1 | 1/2009 | Cooper |
| 2009/0029259 | A1 | 1/2009 | Okazaki et al. |
| 2009/0186270 | A1 | 7/2009 | Harada et al. |
| 2010/0040942 | A1 | 2/2010 | Hatta et al. |
| 2010/0047671 | A1 | 2/2010 | Chiang et al. |
| 2010/0112454 | A1 | 5/2010 | Visco et al. |
| 2010/0196800 | A1 | 8/2010 | Markoski et al. |
| 2010/0323264 | A1 | 12/2010 | Chiang et al. |
| 2011/0086258 | A1 | 4/2011 | Yaginuma et al. |
| 2011/0104527 | A1 | 5/2011 | Choi et al. |
| 2011/0129722 | A1 | 6/2011 | Yoneda |
| 2011/0183169 | A1 | 7/2011 | Bhardwaj et al. |
| 2011/0189520 | A1 | 8/2011 | Carter et al. |
| 2011/0200848 | A1 | 8/2011 | Chiang et al. |
| 2011/0274948 | A1 | 11/2011 | Duduta et al. |
| 2011/0287314 | A1 | 11/2011 | Jung |

(56) References Cited

U.S. PATENT DOCUMENTS

| | | |
|---|---|---|
| 2011/0311857 A1 | 12/2011 | Tucholski |
| 2012/0003547 A1 | 1/2012 | Raj |
| 2012/0058378 A1 | 3/2012 | Lee et al. |
| 2012/0070715 A1 | 3/2012 | Obika |
| 2012/0121963 A1 | 5/2012 | Kwon et al. |
| 2012/0164499 A1 | 6/2012 | Chiang et al. |
| 2012/0315537 A1 | 12/2012 | Ravdel et al. |
| 2013/0000110 A1 | 1/2013 | Takeda et al. |
| 2013/0029205 A1 | 1/2013 | Adams |
| 2013/0029206 A1 | 1/2013 | Lev |
| 2013/0055559 A1 | 3/2013 | Slocum et al. |
| 2013/0065122 A1 | 3/2013 | Chiang et al. |
| 2013/0230641 A1 | 9/2013 | Suzuki |
| 2013/0309547 A1 | 11/2013 | Bazzarella et al. |
| 2013/0337319 A1 | 12/2013 | Doherty et al. |
| 2014/0004437 A1 | 1/2014 | Slocum et al. |
| 2014/0008006 A1 | 1/2014 | Lee et al. |
| 2014/0030623 A1 | 1/2014 | Chiang et al. |
| 2014/0039710 A1 | 2/2014 | Carter et al. |
| 2014/0079992 A1 | 3/2014 | Tanaka |
| 2014/0131630 A1 | 5/2014 | Hwang et al. |
| 2014/0154546 A1 | 6/2014 | Carter et al. |
| 2014/0154565 A1 | 6/2014 | Ku et al. |
| 2014/0170524 A1 | 6/2014 | Chiang et al. |
| 2014/0248521 A1 | 9/2014 | Chiang et al. |
| 2014/0272547 A1 | 9/2014 | Ramasubramanian et al. |
| 2014/0315097 A1 | 10/2014 | Tan et al. |
| 2014/0356736 A1 | 12/2014 | Choi et al. |
| 2014/0363721 A1 | 12/2014 | Bhola et al. |
| 2015/0024279 A1 | 1/2015 | Tan et al. |
| 2015/0027615 A1 | 1/2015 | Singh et al. |
| 2015/0129081 A1 | 5/2015 | Chiang et al. |
| 2015/0140371 A1 | 5/2015 | Slocum et al. |
| 2015/0155596 A1 | 6/2015 | Gardner |
| 2015/0171406 A1 | 6/2015 | Bazzarella et al. |
| 2015/0280267 A1 | 10/2015 | Chiang et al. |
| 2015/0295272 A1 | 10/2015 | Chiang et al. |
| 2015/0357626 A1 | 12/2015 | Holman et al. |
| 2016/0013507 A1 | 1/2016 | Chiang et al. |
| 2016/0031791 A1 | 2/2016 | Clark et al. |
| 2016/0056490 A1 | 2/2016 | Chiang et al. |
| 2016/0056491 A1 | 2/2016 | Chiang et al. |
| 2016/0105042 A1 | 4/2016 | Taylor et al. |
| 2016/0126543 A1 | 5/2016 | Ota et al. |
| 2016/0133916 A1 | 5/2016 | Zagars et al. |
| 2016/0190544 A1 | 6/2016 | Slocum et al. |
| 2016/0218375 A1 | 7/2016 | Chiang et al. |
| 2016/0268621 A1 | 9/2016 | Chiang et al. |
| 2016/0301038 A1 | 10/2016 | Modest et al. |
| 2016/0308218 A1 | 10/2016 | Ota et al. |
| 2016/0344006 A1 | 11/2016 | Ota et al. |
| 2016/0372802 A1 | 12/2016 | Chiang et al. |
| 2017/0018798 A1 | 1/2017 | Tan et al. |
| 2017/0025646 A1 | 1/2017 | Ota et al. |
| 2017/0025674 A1 | 1/2017 | Tan et al. |
| 2017/0033389 A1 | 2/2017 | Chiang et al. |
| 2017/0033390 A1 | 2/2017 | Chiang et al. |
| 2017/0077464 A1 | 3/2017 | Bazzarella et al. |
| 2017/0162863 A1 | 6/2017 | Doherty et al. |
| 2017/0214034 A1 | 7/2017 | Ota et al. |
| 2017/0237111 A1 | 8/2017 | Holman et al. |
| 2017/0237112 A1 | 8/2017 | Holman et al. |
| 2017/0288281 A1 | 10/2017 | Chiang et al. |
| 2018/0034090 A1 | 2/2018 | Chiang et al. |
| 2018/0175428 A1 | 6/2018 | Chiang et al. |
| 2018/0175445 A1 | 6/2018 | Tan et al. |
| 2018/0233708 A1 | 8/2018 | Bazzarella et al. |
| 2018/0233722 A1 | 8/2018 | Holman et al. |
| 2018/0287220 A1 | 10/2018 | Woodford et al. |
| 2019/0036101 A1 | 1/2019 | Tyler et al. |
| 2019/0058184 A1 | 2/2019 | Bazzarella et al. |
| 2019/0245242 A1 | 8/2019 | Tan et al. |
| 2019/0319460 A1 | 10/2019 | Taylor et al. |
| 2019/0326562 A1 | 10/2019 | Ota et al. |
| 2019/0348705 A1 | 11/2019 | Chen et al. |
| 2019/0355998 A1 | 11/2019 | Chiang et al. |
| 2019/0363351 A1 | 11/2019 | Ota et al. |
| 2019/0393477 A1 | 12/2019 | Lawrence et al. |
| 2020/0014025 A1 | 1/2020 | Zagars et al. |
| 2020/0044296 A1 | 2/2020 | Chiang et al. |
| 2020/0106094 A1 | 4/2020 | Ota et al. |
| 2020/0161688 A1 | 5/2020 | Chiang et al. |
| 2020/0220118 A1 | 7/2020 | Bazzarella et al. |
| 2020/0220204 A1 | 7/2020 | Tan et al. |
| 2020/0259338 A1 | 8/2020 | Taylor et al. |
| 2020/0321601 A1 | 10/2020 | Slocum et al. |
| 2020/0358129 A1 | 11/2020 | Chen et al. |
| 2020/0411825 A1 | 12/2020 | Bazzarella et al. |
| 2021/0091366 A1 | 3/2021 | Bazzarella et al. |
| 2021/0167351 A1 | 6/2021 | Zagars et al. |
| 2021/0226192 A1 | 7/2021 | Aranami et al. |
| 2021/0249678 A1 | 8/2021 | Chiang et al. |
| 2021/0249695 A1 | 8/2021 | Aranami et al. |
| 2021/0265631 A1 | 8/2021 | Chen et al. |
| 2021/0359527 A1 | 11/2021 | Taylor et al. |
| 2021/0376380 A1 | 12/2021 | Tan et al. |
| 2021/0384516 A1 | 12/2021 | Lawrence et al. |
| 2022/0021019 A1 | 1/2022 | Tan et al. |
| 2022/0037749 A1 | 2/2022 | Bazzarella et al. |
| 2022/0052403 A1 | 2/2022 | Chen et al. |
| 2022/0077445 A1 | 3/2022 | Ota et al. |
| 2022/0085440 A1 | 3/2022 | Ota et al. |
| 2022/0093929 A1 | 3/2022 | Chen et al. |
| 2022/0115710 A1 | 4/2022 | Zagars et al. |
| 2022/0172916 A1 | 6/2022 | Lawrence et al. |
| 2022/0173446 A1 | 6/2022 | Chiang et al. |
| 2022/0200306 A1 | 6/2022 | Kusachi et al. |
| 2022/0231274 A1 | 7/2022 | Zagars et al. |
| 2022/0238923 A1 | 7/2022 | Chen et al. |
| 2022/0263104 A1 | 8/2022 | Chiang et al. |
| 2022/0263193 A1 | 8/2022 | Chen et al. |
| 2022/0278427 A1 | 9/2022 | Lawrence et al. |
| 2022/0285669 A1 | 9/2022 | Doherty et al. |
| 2022/0352597 A1 | 11/2022 | Chen et al. |

FOREIGN PATENT DOCUMENTS

| | | |
|---|---|---|
| CN | 101171703 A | 4/2008 |
| CN | 101212070 | 7/2008 |
| CN | 102089921 A | 6/2011 |
| CN | 102983369 A | 3/2013 |
| CN | 104040764 A | 9/2014 |
| CN | 111384404 A | 7/2020 |
| DE | 102013202367 A1 | 8/2014 |
| EP | 0602976 A1 | 6/1994 |
| EP | 1422769 A1 | 5/2004 |
| JP | S62-008932 B2 | 2/1987 |
| JP | H02-94619 A | 4/1990 |
| JP | H06-187998 | 7/1994 |
| JP | H10-027602 A | 1/1998 |
| JP | H11-111265 | 4/1999 |
| JP | 2000-260423 A | 9/2000 |
| JP | 2002-359006 | 12/2002 |
| JP | 2003-123832 | 4/2003 |
| JP | 2003-532277 T | 10/2003 |
| JP | 2003-317731 A | 11/2003 |
| JP | 2004-158222 A | 6/2004 |
| JP | 2005-056729 A | 3/2005 |
| JP | 2005-071658 | 3/2005 |
| JP | 2006-172766 A | 6/2006 |
| JP | 2006-172773 A | 6/2006 |
| JP | 2006-269288 A | 10/2006 |
| JP | 2006-324114 A | 11/2006 |
| JP | 2007-115678 A | 5/2007 |
| JP | 3993223 B2 | 10/2007 |
| JP | 2007-335283 | 12/2007 |
| JP | 2008-034556 A | 2/2008 |
| JP | 2008198492 A | 8/2008 |
| JP | 2009-059709 A | 3/2009 |
| JP | 2009-176513 A | 8/2009 |
| JP | 2010-062008 | 3/2010 |
| JP | 2010-073421 A | 4/2010 |
| JP | 2010-245000 A | 10/2010 |
| JP | 2011-077269 | 4/2011 |

(56) References Cited

FOREIGN PATENT DOCUMENTS

| JP | 4873703 B2 | 2/2012 |
|---|---|---|
| JP | 2012-204182 A | 10/2012 |
| JP | 2013-145649 | 7/2013 |
| JP | 2015-520490 | 7/2015 |
| KR | 20100016711 A | 2/2010 |
| WO | WO 85/00248 | 1/1985 |
| WO | WO 2001/041232 | 7/2001 |
| WO | WO-2006120959 A1 | 11/2006 |
| WO | WO 2010/032362 | 3/2010 |
| WO | WO 2010/118060 | 10/2010 |
| WO | WO 2010/137415 | 12/2010 |
| WO | WO 2010/150077 | 12/2010 |
| WO | WO 2011/052094 | 5/2011 |
| WO | WO 2011/095758 | 8/2011 |
| WO | WO 2011/099793 | 8/2011 |
| WO | WO 2012/024499 | 2/2012 |
| WO | WO 2012/077707 | 6/2012 |
| WO | WO 2012/088442 | 6/2012 |
| WO | WO 2013/124423 | 8/2013 |
| WO | WO 2013/173689 | 11/2013 |
| WO | WO-2014093876 A1 | 6/2014 |
| WO | WO 2014/150210 | 9/2014 |
| WO | WO 2016/073575 | 5/2016 |
| WO | WO-2016131141 A1 | 8/2016 |
| WO | WO202014268 A1 | 1/2020 |
| WO | WO-2021087465 A1 | 5/2021 |
| WO | WO 2022/067081 A1 | 3/2022 |
| WO | WO-2022212404 A1 | 10/2022 |

OTHER PUBLICATIONS

Office Action for U.S. Appl. No. 13/607,021, dated Jul. 10, 2015, 4 pages.
International Search Report and Written Opinion for International Application No. PCT/US2012/054219, dated Feb. 21, 2013, 13 pages.
Office Action for U.S. Appl. No. 14/926,760, dated Jun. 27, 2018, 10 pages.
Office Action for U.S. Appl. No. 14/926,760, dated Feb. 25, 2019, 9 pages.
Notification of the First Office Action for Chinese Application No. 201280051582.5, dated Nov. 4, 2015, 19 pages.
Notification of the Second Office Action for Chinese Application No. 201280051582.5, dated Aug. 26, 2016, 7 pages.
Supplementary European Search Report for European Application No. 12830248.6, dated Mar. 6, 2015, 6 pages.
Office Action for European Application No. 12830248.6, dated Jan. 19, 2017, 5 pages.
Notice of Reasons for Rejection for Japanese Patent Application No. 2014-529905, dated Jun. 29, 2016, 9 pages.
Office Action for U.S. Appl. No. 13/606,986, dated Jan. 14, 2016, 14 pages.
Office Action for U.S. Appl. No. 13/606,986, dated Jun. 3, 2016, 18 pages.
Office Action for U.S. Appl. No. 13/606,986, dated Jan. 26, 2017, 16 pages.
International Search Report and Written Opinion for International Application No. PCT/US2012/054218, dated Feb. 15, 2013, 10 pages.
Office Action for U.S. Appl. No. 13/832,836, dated Feb. 26, 2015, 9 pages.
Supplementary European Search Report for European Application No. 13791074.1, dated Mar. 31, 2016, 6 pages.
Office Action for European Application No. 13791074.1, dated Aug. 7, 2018, 5 pages.
Notice of Reasons for Rejection for Japanese Application No. 2015-512878, dated Apr. 19, 2017, 7 pages.
Notice of Reasons for Rejection for Japanese Application No. 2015-512878, dated Mar. 29, 2019, 13 pages.
Notice of Reasons for Rejection for Japanese Application No. 2015-512878, dated Oct. 1, 2019, 6 pages.
Office Action for U.S. Appl. No. 14/543,489, dated Jul. 6, 2015, 9 pages.
Office Action for U.S. Appl. No. 14/543,489, dated Feb. 12, 2016, 7 pages.
International Search Report and Written Opinion for International Application No. PCT/US2013/041537, dated Oct. 10, 2013.
Notice of Reasons for Rejection for Japanese Application No. 2018-088757, dated Apr. 8, 2019, 9 pages.
Notice of Reasons for Rejection for Japanese Application No. 2018-088757, dated Oct. 2, 2019, 6 pages.
Notice of Reasons for Rejection for Japanese Application No. 2018-088757, dated Apr. 2, 2020, 6 pages.
Office Action for U.S. Appl. No. 15/188,374, dated Apr. 12, 2017, 9 pages.
Office Action for U.S. Appl. No. 15/724,701, dated Apr. 4, 2019, 8 pages.
First Office Action for Chinese Application No. 201580057914.4, dated Jul. 8, 2019, 17 pages.
Second Office Action for Chinese Application No. 201580057914.4, dated Dec. 12, 2019, 7 pages.
Third Office Action for Chinese Application No. 201580057914.4, dated Apr. 13, 2020, 21 pages.
Office Action for European Application No. 15794037.0, dated Jun. 4, 2019, 9 pages.
Office Action for European Application No. 15794037.0, dated Jan. 3, 2020, 6 pages.
Notice of Reasons for Rejection for Japanese Application No. 2017-517309, dated Aug. 26, 2019, 11 pages.
Substantive Examination Adverse Report (Section 30(1) / 30(2)) and Search Report for Malaysian Application No. PI2017000573, dated May 8, 2020, 4 pages.
Office Action for U.S. Appl. No. 14/932,153, dated Aug. 7, 2018, 6 pages.
Office Action for U.S. Appl. No. 14/932,153, dated Jan. 31, 2019, 7 pages.
International Search Report and Written Opinion for International Application No. PCT/US2015/058992, dated Jan. 14, 2016, 10 pages.
First Office Action for Chinese Application No. 201680004584.7, dated Feb. 3, 2019, 17 pages.
Second Office Action for Chinese Application No. 201680004584.7, dated Aug. 15, 2019, 27 pages.
Third Office Action for Chinese Application No. 201680004584.7, dated Jan. 3, 2020, 24 pages.
Extended European Search Report for European Application No. 16812533.4, dated Nov. 19, 2018, 7 pages.
Office Action for Japanese Application No. 2017-526929, dated Feb. 18, 2020,19 pages.
Substantive Examination Report (Restriction) for Philippines Patent Application No. 1-2017-500970, dated Mar. 14, 2019, 3 pages.
Subsequent Substantive Examination Report for Philippines Patent Application No. 1-2017-500970, dated Sep. 24, 2019, 10 pages.
Subsequent Substantive Examination Report for Philippines Patent Application No. 1-2017-500970, dated Dec. 6, 2019, 4 pages.
Office Action for U.S. Appl. No. 15/185,625, dated Nov. 2, 2017, 11 pages.
Office Action for U.S. Appl. No. 15/185,625, dated May 18, 2018, 9 pages.
International Search Report and Written Opinion for International Application No. PCT/US2016/038098, dated Oct. 31, 2016, 14 pages.
Armand, M. et al., "Conjugated dicarboxylate anodes for Li-ion batteries," Nature Materials, 8:120-125 (2009).
Bervas, M. et al., "Investigation of the Lithiation and Delithiation Conversion Mechanisms in a Bismuth Fluoride Nanocomposites," Journal of The Electrochemical Society, 153(4):A799-A808 (2006).
Chan, C. K. et al., "High-performance lithium battery anodes using silicon nanowires," Nature Nanotechnology, 3:31-35 (2008).
Duduta, M. et al., "Semi-Solid Lithium Rechargeable Flow Battery," Advanced Energy Materials. 1(4):511-516 (2011).

(56) References Cited

OTHER PUBLICATIONS

Li, H. et al., "Li-Storage via Heterogeneous Reaction in Selected Binary Metal Fluorides and Oxides," Journal of Electrochemical Society, 151(11):A1878-A1885 (2004).
Nakahara, K. et al. "Rechargeable batteries with organic radical cathodes," Chemical Physics Letters, 359:351-354 (2002).
Nishide, H. et al., "Organic radical battery: nitroxide polymers as a cathode-active material," Electrochimica Acta, 50:827-831 (2004).
Plitz, I. et al., "Structure and Electrochemistry of Carbon-Metal Fluoride Nanocomposites Fabricated by a Solid State Redox Conversion Reaction", Journal of The Electrochemical Society, 152(2):A307-A315 (2005).
Office Action for U.S. Appl. No. 16/201,283, dated Jun. 15, 2020, 13 pages.
Notice of Reasons for Rejection for Japanese Application No. 2017-517309, dated May 18, 2020, 13 pages.
Rejection Decision for Chinese Application No. 201680004584.7, dated May 11, 2020, 17 pages.
Office Action for U.S. Appl. No. 16/736,460, dated Feb. 2, 2021, 13 pages.
Extended European Search Report for European Application No. 20153431.0, dated Aug. 7, 2020, 12 pages.
Notice of Reasons for Rejection for Japanese Application No. 2018-088757, dated Oct. 27, 2020, 7 pages.
Notice of Reasons for Rejection for Japanese Application No. 2018-088757, dated Jan. 21, 2021, 4 pages.
Office Action for U.S. Appl. No. 16/705,949, dated Dec. 9, 2020, 7 pages.
Fourth Office Action for Chinese Application No. 201580057914.4, dated Jul. 29, 2020, 14 pages.
Office Action for European Application No. 15794037.0, dated Aug. 27, 2020, 7 pages.
First Examination Report for Indian Application No. 201717010973, dated Aug. 16, 2020, 6 pages.
Decision of Rejection for Japanese Application No. 2017-517309, dated Feb. 2, 2021, 7 pages.
Office Action for Vietnam Application No. 1-2017-01769, dated Jan. 29, 2021, 2 pages.
Examination Report No. 1 for Australian Application No. 2016280285, dated Nov. 2, 2020, 6 pages.
Notification of Reexamination for Chinese Application No. 201680004584.7, dated Oct. 28, 2020, 21 pages.
Office Action for European Application No. 16812533.4, dated Jul. 31, 2020, 4 pages.
Office Action for Indian Application No. 201717017343, dated Jul. 9, 2020, 6 pages.
Substantive Examination Adverse Report (Section 30(1) / 30(2)) and Search Report for Malaysian Application No. PI2017000885, dated Jun. 18, 2020, 4 pages.
Office Action for U.S. Appl. No. 16/201,283, dated Oct. 23, 2020, 13 pages.
Office Action for Canadian Application No. 2,895,142, dated Oct. 22, 2021, 6 pages.
Examination Report for Canadian Application No. 2.962,788 dated Oct. 6, 2021, 3 pages.
Office Action for U.S. Appl. No. 16/736,460, dated Sep. 28, 2021, 16 pages.
Decision to Grant for Japanese Application No. 2020-184414, dated May 23, 2022, 3 Pages.
Examination Report for Canadian Application No. 2,969,135, dated Mar. 30, 2022, 3 pages.
Office Action for Japanese Application No. 2021-092052, dated Mar. 28, 2022, 13 pages.
Office Action for Canadian Application No. 2,962,788, dated Mar. 31, 2022, 4 pages.
Extended European Search Report for European Application No. 21196368.1, dated Feb. 16, 2022, 8 pages.
Office Action for Japanese Application No. 2021-054104, dated Dec. 27, 2021, 7 pages.
First Office Action for Chinese Application No. 202110490592.X dated May 11, 2022, 21 pages.
International Preliminary Report on Patentability for International Application No. PCT/US2020061498, dated Jun. 2, 2022, 13 pages.
International Search Report and Written Opinion for International Application No. PCT/US2022/022382, dated Jul. 18, 2022, 14 pages.
Invitation to Pay Additional Fees for International Application No. PCT/US2020/061498, mailed Feb. 18, 2021, 13 pages.
Office Action for U.S. Appl. No. 17/169,862, dated Sep. 21, 2022, 9 pages.
Office Action for U.S. Appl. No. 17/402,059, filed Aug. 5, 2022, 6 pages.
Notice of Reasons for Rejection for Japanese Application No. 2021-054104, dated Sep. 13, 2022, 4 pages.
Office Action for Canadian Application No. 2,962,788, dated Nov. 1, 2022, 4 pages.
Office Action for Korean Application No. 10-2017-7015132, dated Oct. 12, 2022, 17 pages.
Reinhart et al., "Research and Demonstration Center for the Production of Large-Area Lithium-Ion Cells," Future Trends in Production Engineering, Jan. 1, 2012, pp. 3-12.

\* cited by examiner

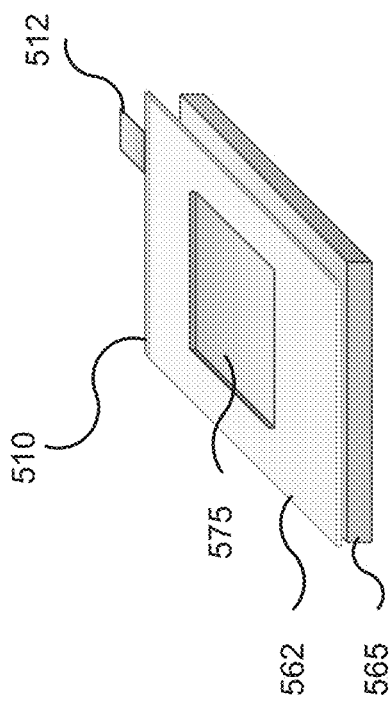
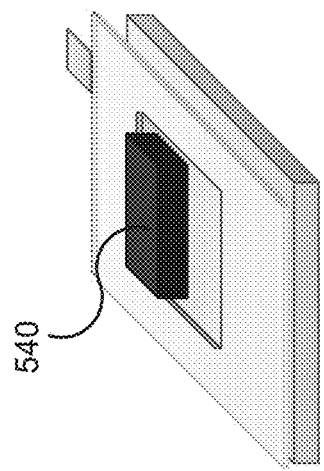
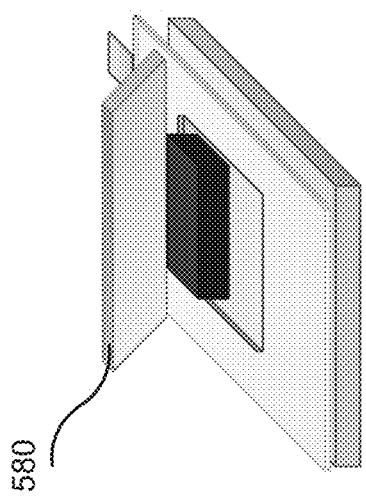

ELECTROCHEMICAL CELLS HAVING SEMI-SOLID ELECTRODES AND METHODS OF MANUFACTURING THE SAME

CROSS-REFERENCE TO RELATED APPLICATIONS

This application is a continuation of U.S. patent application Ser. No. 16/821,241, filed Mar. 17, 2020, now U.S. Pat. No. 10,886,521 and titled "Electrochemical Cells Having Semi-Solid Electrodes and Methods of Manufacturing the Same," which is a continuation of U.S. patent application Ser. No. 14/932,153, filed Nov. 4, 2015, now U.S. Pat. No. 10,637,038 and titled "Electrochemical Cells Having Semi-Solid Electrodes and Methods of Manufacturing the Same," which claims priority to and the benefit of U.S. Provisional Patent Application Ser. No. 62/075,373, filed Nov. 5, 2014 and titled "Electrochemical Cells Having Semi-Solid Electrodes and Methods of Manufacturing the Same," the disclosures of which are hereby incorporated by reference in its their entirety.

BACKGROUND

Embodiments described herein relate generally to electrochemical cells having semi-solid electrodes that are coated on only one side of current collectors, stacks of such electrochemical cells, and methods of forming such electrochemical cell stacks.

Batteries are typically constructed of solid electrodes, separators, electrolyte, and ancillary components such as, for example, packaging, thermal management, cell balancing, consolidation of electrical current carriers into terminals, and/or other such components. The electrodes typically include active materials, conductive materials, binders and other additives.

Some known methods for preparing batteries include coating a metallic substrate (e.g., a current collector) with slurry composed of an active material, a conductive additive, and a binding agent dissolved or dispersed in a solvent, evaporating the solvent, and calendering the dried solid matrix to a specified thickness. The electrodes are then cut, packaged with other components, infiltrated with electrolyte and the entire package is then sealed.

Such known methods generally involve complicated and expensive manufacturing steps such as casting the electrode and are only suitable for electrodes of limited thickness, for example, less than 100 µm (final single sided coated thickness). These known methods for producing electrodes of limited thickness result in batteries with lower capacity, lower energy density and a high ratio of inactive components to active materials. Furthermore, the binders used in known electrode formulations can increase tortuosity and decrease the ionic conductivity of the electrode.

To increase the active material to inactive material ratio, conventional electrochemical cells are generally formed by coating the electrode active material (i.e., the anode formulation slurry and the cathode formulation slurry) on both sides of a current collector. A separator is disposed between the electrodes, i.e. the anode and cathode, to form a conventional electrochemical cell. A plurality of such electrochemical cells can be stacked on top of each other, generally with a spacer disposed therebetween, to form an electrochemical cell stack. While this positively impacts the active material to inactive material ratio, it introduces complications in the manufacturing process. Furthermore, the time required to assemble the electrochemical battery can be significant. This can increase the exposure of the electrode materials to temperature fluctuations or humidity which can degrade the electrode materials and thereby, the electronic properties of the electrodes.

Thus, it is an enduring goal of energy storage systems development to develop new electrochemical batteries and electrodes that have longer cycle life, increased energy density, charge capacity and overall performance.

SUMMARY

Embodiments described herein relate generally to electrochemical cells having semi-solid electrodes that are coated on only one side of a current collector. In some embodiments, an electrochemical cell includes a semi-solid positive electrode coated on only one side of a positive current collector and a semi-solid negative electrode coated on only one side of a negative current collector. A separator is disposed between the semi-solid positive electrode and the semi-solid negative electrode. At least one of the semi-solid positive electrode and the semi-solid negative electrode can have a thickness of at least about 250 µm.

BRIEF DESCRIPTION OF THE DRAWINGS

FIGS. 11A-11I illustrate steps of a process to manufacture an electrochemical cell, according to an embodiment.

DETAILED DESCRIPTION

Figure 1:
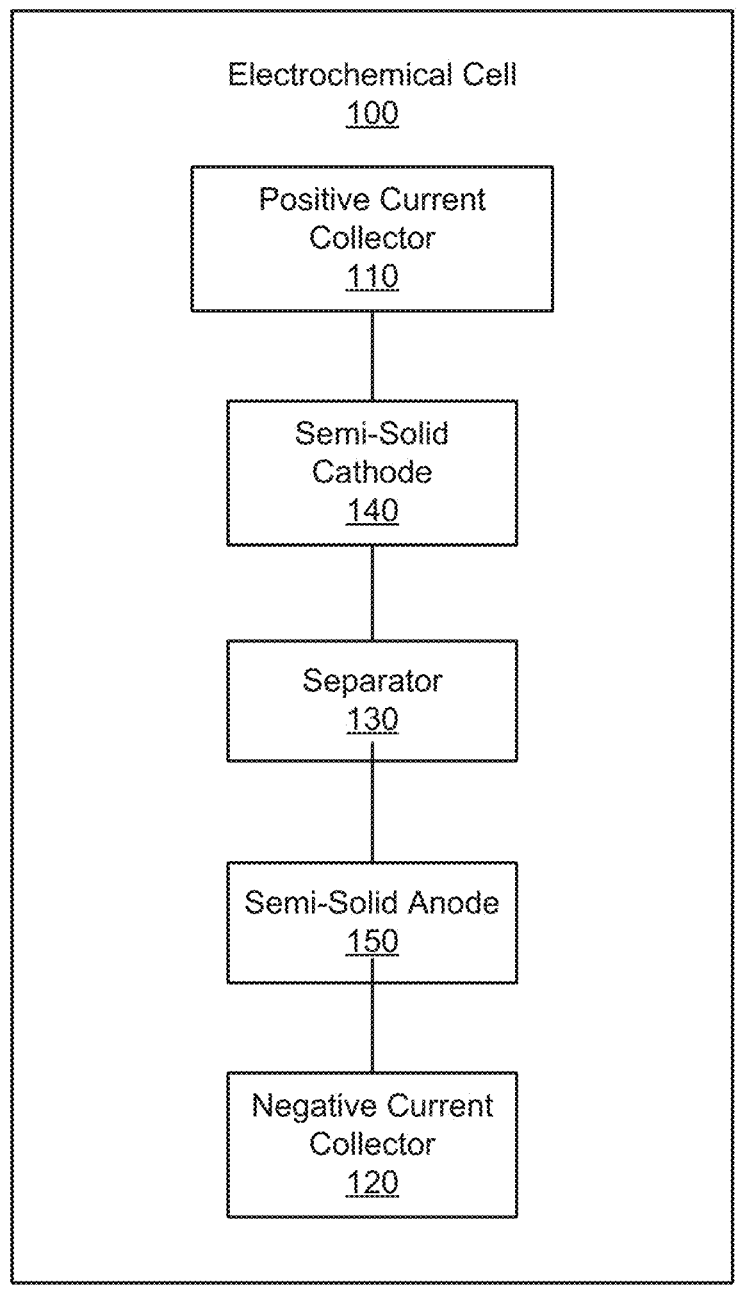
FIG. 1 is a schematic illustration of an electrochemical cell according to an embodiment.

Consumer electronic batteries have gradually increased in energy density with the progress of lithium-ion battery technology. The stored energy or charge capacity of a manufactured battery is a function of: (1) the inherent charge capacity of the active material (mAh/g), (2) the volume of the electrodes ($cm^3$) (i.e., the product of the electrode thickness, electrode area, and number of layers (stacks)), and (3) the loading of active material in the electrode media (e.g., grams of active material per $cm^3$ of electrode media). Therefore, to enhance commercial appeal (e.g., increased energy density and decreased cost), it is generally desirable to increase the areal charge capacity (mAh/cm$^2$). The areal charge capacity can be increased, for example, by utilizing active materials that have a higher inherent charge capacity, increasing relative percentage of active charge storing material (i.e., "loading") in the overall electrode formulation, and/or increasing the relative percentage of electrode material used in any given battery form factor. Said another way, increasing the ratio of active charge storing components (e.g., the electrodes) to inactive components (e.g., the separators and current collectors), increases the overall energy density of the battery by eliminating or reducing components that are not contributing to the overall performance of the battery. One way to accomplish increasing the areal charge capacity, and therefore reducing the relative percentage of inactive components, is by increasing the thickness of the electrodes.

Semi-solid electrodes described herein can be made: (i) thicker (e.g., greater than 250 μm—up to 2,000 μm or even greater) due to the reduced tortuosity and higher electronic conductivity of the semi-solid electrode, (ii) with higher loadings of active materials, and (iii) with a simplified manufacturing process utilizing less equipment. These semi-solid electrodes can be formed in fixed or flowable configurations and decrease the volume, mass and cost contributions of inactive components with respect to active components, thereby enhancing the commercial appeal of batteries made with the semi-solid electrodes. In some embodiments, the semi-solid electrodes described herein are binderless and/or do not use binders that are used in conventional battery manufacturing. Instead, the volume of the electrode normally occupied by binders in conventional electrodes, is now occupied by: 1) electrolyte, which has the effect of decreasing tortuosity and increasing the total salt available for ion diffusion, thereby countering the salt depletion effects typical of thick conventional electrodes when used at high rate, 2) active material, which has the effect of increasing the charge capacity of the battery, or 3) conductive additive, which has the effect of increasing the electronic conductivity of the electrode, thereby countering the high internal impedance of thick conventional electrodes. The reduced tortuosity and a higher electronic conductivity of the semi-solid electrodes described herein, results in superior rate capability and charge capacity of electrochemical cells formed from the semi-solid electrodes.

Since the semi-solid electrodes described herein, can be made substantially thicker than conventional electrodes, the ratio of active materials (i.e., the semi-solid cathode and/or anode) to inactive materials (i.e. the current collector and separator) can be much higher in a battery formed from electrochemical cell stacks that include semi-solid electrodes relative to a similar battery formed from electrochemical cell stacks that include conventional electrodes. This substantially increases the overall charge capacity and energy density of a battery that includes the semi-solid electrodes described herein. Examples of electrochemical cells utilizing thick semi-solid electrodes and various formulations thereof are described in U.S. Pat. No. 8,993,159 (also referred to as "the '159 patent"), issued Mar. 31, 2015, entitled "Semi-Solid Electrodes Having High Rate Capability," U.S. Patent Publication No. 2014/0315097 (also referred to as "the '097 publication), filed Mar. 10, 2014, entitled "Asymmetric Battery Having a Semi-Solid Cathode and High Energy Density Anode," and U.S. Patent Publication No. 2015/0024279 (also referred to as "the '279 publication") filed Jul. 21, 2014, entitled "Semi-Solid Electrodes with Gel Polymer Additive," the entire disclosures of which are hereby incorporated by reference.

The semi-solid electrodes described herein are formulated as a slurry such that the electrolyte is included in the slurry formulation. This is in contrast to conventional electrodes, for example calendered electrodes, where the electrolyte is generally added to the electrochemical cell once the electrochemical cell has been disposed in a container, for example, a pouch or a can. Exposure of the semi-solid electrodes to the ambient environments for longer periods of time can increase evaporation of the electrolyte, thereby affecting physical characteristics (e.g., flowability) and/or electronic characteristics (e.g., conductivity, charge capacity, energy density, etc.) of the electrochemical cell. Moreover, moisture in the ambient environment can also detrimentally affect the performance of the electrolyte. Thus, it would be of benefit to assemble the electrochemical cell that includes the semi-solid electrodes described herein, in the shortest amount of time to limit electrolyte evaporation and/or degradation. In some instances, however, disposing the semi-solid electrodes on both sides of a current collector (e.g., a metal foil) can take a substantial amount of time. Moreover, to form an electrochemical cell stack from such electrochemical cells, a spacer is often disposed between adjacent electrochemical cells, which can further increase the time that the semi-solid electrodes included in the electrochemical cells are exposed to the ambient atmosphere.

Embodiments of electrochemical cells described herein include semi-solid electrodes that are coated on only one side of current collectors. Coating only one side of the current collectors reduces the manufacturing complexity as well as the time associated with coating both sides of the current collectors. An electrochemical cell stack can then easily be formed by stacking the electrochemical cells such that the current collectors of adjacent electrochemical cells abut each other. For example, an uncoated side of a positive current collector included in a first electrochemical cell can abut an uncoated side of a positive current collector included in a second electrochemical cell. Similarly, an uncoated side of a negative current collector included in the first electrochemical cell can abut an uncoated side of a negative current collector included in a third electrochemical cell, and so on. This can further reduce the amount of time used for forming the electrochemical cell stack, thereby minimizing exposure of the electrodes to ambient environment. The short assembly time required to form the electrochemical cell also reduces electrolyte evaporation and or degradation of the semi-solid electrodes due to water permeation can also be minimized.

In some embodiments, an electrochemical cell includes a semi-solid positive electrode coated on only one side of a positive current collector and a semi-solid negative electrode coated on only one side of a negative current collector. An ion-permeable membrane is disposed between the semi-solid positive electrode and the semi-solid negative electrode. At least one of the semi-solid positive electrode and the semi-solid negative electrode has a thickness of at least about 250 μm. In some embodiments, the positive current collector and/or the negative current collector can include a metal foil, for example, an aluminum foil or a copper foil. In some embodiments, the electrochemical cell can be disposed in a vacuum sealed pouch.

In some embodiments, a method of forming an electrochemical cell stack includes coating a semi-solid cathode on only one side of a positive current collector and coating a semi-solid anode on only one side of a negative current collector. A separator is disposed between the semi-solid cathode and the semi-solid anode to form a first electrochemical cell. A second electrochemical cell is formed substantially similar to the first electrochemical cell. Furthermore, a third electrochemical cell is formed substantially similar to the first electrochemical cell, and so on. The second electrochemical cell is disposed on the first electrochemical cell such that an uncoated side of a positive current collector of the second electrochemical cell is disposed on an uncoated side of the positive current collector of the first electrochemical cell. Similarly, the third electrochemical cell is disposed on the first electrochemical cell such that an uncoated side of a negative current collector of the third electrochemical cell is disposed on an uncoated side of the negative current collector of the first electrochemical cell, thereby forming the electrochemical cell stack. In some embodiments, the time period required to form the electrochemical cell stack can be sufficiently reduced such that the evaporation of an electrolyte included in the semi-solid cathode and/or the semi-solid anode of any of the first electrochemical cell, the second electrochemical cell, and the third electrochemical cell, is minimized.

The mixing and forming of a semi-solid electrode generally includes: (i) raw material conveyance and/or feeding, (ii) mixing, (iii) mixed slurry conveyance, (iv) dispensing and/or extruding, and (v) forming. In some embodiments, multiple steps in the process can be performed at the same time and/or with the same piece of equipment. For example, the mixing and conveyance of the slurry can be performed at the same time with an extruder. Each step in the process can include one or more possible embodiments. For example, each step in the process can be performed manually or by any of a variety of process equipment. Each step can also include one or more sub-processes and, optionally, an inspection step to monitor process quality.

In some embodiments, the process conditions can be selected to produce a prepared slurry having a mixing index of at least about 0.80, at least about 0.90, at least about 0.95, or at least about 0.975. In some embodiments, the process conditions can be selected to produce a prepared slurry having an electronic conductivity of at least about $10^{-6}$ S/cm, at least about $10^{-5}$ S/cm, at least about $10^{-4}$ S/cm, at least about $10^{-3}$ S/cm, or at least about $10^{-2}$ S/cm. In some embodiments, the process conditions can be selected to produce a prepared slurry having an apparent viscosity at room temperature of less than about 100,000 Pa-s, less than about 10,000 Pa-s, or less than about 1,000 Pa-s, all at an apparent shear rate of 1,000 $s^{-1}$. In some embodiments, the process conditions can be selected to produce a prepared slurry having two or more properties as described herein. Examples of systems and methods that can be used for preparing the semi-solid electrode compositions described herein are described in U.S. Patent publication No. 2013/0337319 (also referred to as "the '319 publication"), filed Mar. 15, 2013, entitled "Electrochemical Slurry Compositions and Methods for Preparing the Same," the entire disclosure of which is hereby incorporated by reference.

As used herein, the term "about" and "approximately" generally mean plus or minus 10% of the value stated, e.g., about 250 μm would include 225 μm to 275 μm, about 1,000 μm would include 900 μm to 1,100 μm.

As used herein, the term "semi-solid" refers to a material that is a mixture of liquid and solid phases, for example, such as particle suspension, colloidal suspension, emulsion, gel, or micelle.

As used herein, the terms "activated carbon network" and "networked carbon" relate to a general qualitative state of an electrode. For example, an electrode with an activated carbon network (or networked carbon) is such that the carbon particles within the electrode assume an individual particle morphology and arrangement with respect to each other that facilitates electrical contact and electrical conductivity between particles and through the thickness and length of the electrode. Conversely, the terms "unactivated carbon network" and "unnetworked carbon" relate to an electrode wherein the carbon particles either exist as individual particle islands or multi-particle agglomerate islands that may not be sufficiently connected to provide adequate electrical conduction through the electrode.

FIG. 1 shows a schematic illustration of an electrochemical cell 100. The electrochemical cell 100 includes a positive current collector 110 and a negative current collector 120. A semi-solid cathode 140 is disposed on the positive current collector 110, and a semi-solid anode 150 is disposed on the negative current collector 120. A separator 130 is disposed between the semi-solid cathode 140 and the semi-solid anode 150. At least one of the semi-solid cathode 140 and the semi-solid anode 150 has a thickness of at least about 250 μm, for example, in the range of about 250 μm to about 2,000 μm.

The positive current collector 110 and the negative current collector 120 can be any current collectors that are electronically conductive and are electrochemically inactive under the operating conditions of the cell. Typical current collectors for lithium cells include copper, aluminum, or titanium for the negative current collector 120 and aluminum for the positive current collector 110, in the form of sheets or mesh, or any combination thereof. Current collector materials can be selected to be stable at the operating potentials of the semi-solid cathode 140 and the semi-solid anode 150 of the electrochemical cell 100. For example, in non-aqueous lithium systems, the positive current collector 110 can include aluminum, or aluminum coated with conductive material that does not electrochemically dissolve at operating potentials of 2.5-5.0V with respect to Li/Li$^+$. Such materials include platinum, gold, nickel, conductive metal oxides such as vanadium oxide, and carbon. The negative current collector 120 can include copper or other metals that do not form alloys or intermetallic compounds with lithium, carbon, and/or coatings comprising such materials disposed on another conductor. Each of the positive current collector 110 and the negative current collector 120 can have a thickness of less than about 20 microns, for example, about 1 micron, 2 microns, 3 microns, 4 microns, 5 microns, 6 microns, 7 microns, 8 microns, 9 microns, 10 microns, 12 microns, 14 microns, 16 microns, or 18 microns, inclusive of all ranges therebetween. Use of such thin positive current collector 110 and negative current collector 120 can substantially reduce the cost and overall weight of the electrochemical cell 100.

The semi-solid cathode 140 and the semi-solid anode 150 included in the electrochemical cell 100 are separated by a separator 130. The separator 130 can be any conventional membrane that is capable of ion transport, i.e., an ion-permeable membrane. In some embodiments, the separator 130 is a liquid impermeable membrane that permits the transport of ions therethrough, namely a solid or gel ionic conductor. In some embodiments the separator 130 is a porous polymer membrane infused with a liquid electrolyte that allows for the shuttling of ions between the semi-solid cathode 140 and the semi-solid anode 150 electroactive materials, while preventing the transfer of electrons. In some embodiments, the separator 130 is a microporous membrane that prevents particles forming the semi-solid cathode 140 and the semi-solid anode 150 compositions from crossing the membrane. In some embodiments, the separator 130 is a single or multilayer microporous separator, optionally with the ability to fuse or "shut down" above a certain temperature so that it no longer transmits working ions, of the type used in the lithium ion battery industry and well-known to those skilled in the art. In some embodiments, the separator 130 can include a polyethyleneoxide (PEO) polymer in which a lithium salt is complexed to provide lithium conductivity, or Nafion™ membranes which are proton conductors. For example, PEO based electrolytes can be used as the separator 130, which is pinhole-free and a solid ionic conductor, optionally stabilized with other membranes such as glass fiber separators as supporting layers. PEO can also be used as a slurry stabilizer, dispersant, etc. in the positive or negative redox compositions. PEO is stable in contact with typical alkyl carbonate-based electrolytes. This can be especially useful in phosphate-based cell chemistries with cell potential at the positive electrode that is less than about 3.6 V with respect to Li metal. The operating temperature of the redox cell can be elevated as necessary to improve the ionic conductivity of the membrane.

The semi-solid cathode 140 can include an ion-storing solid phase material which can include, for example, an active material and/or a conductive material. The quantity of the ion-storing solid phase material can be in the range of about 0% to about 80% by volume. The cathode 140 can include an active material such as, for example, a lithium bearing compound (e.g., Lithium Iron Phosphate (LFP), $LiCoO_2$, $LiCoO_2$ doped with Mg, $LiNiO_2$, $Li(Ni, Co, Al)O_2$ (known as "NCA"), $Li(Ni, Mn, Co)O_2$ (known as "NMC"), $LiMn_2O_4$ and its derivatives, etc.). The cathode 140 can also include a conductive material such as, for example, graphite, carbon powder, pyrolytic carbon, carbon black, carbon fibers, carbon microfibers, carbon nanotubes (CNTs), single walled CNTs, multi walled CNTs, fullerene carbons including "bucky balls," graphene sheets and/or aggregate of graphene sheets, any other conductive material, alloys or combination thereof. The cathode 140 can also include a non-aqueous liquid electrolyte such as, for example, ethylene carbonate, dimethyl carbonate, diethyl carbonate, SSDE, or any other electrolyte described herein or combination thereof.

In some embodiment, the semi-solid anode 150 can also include an ion-storing solid phase material which can include, for example, an active material and/or a conductive material. The quantity of the ion-storing solid phase material can be in the range of about 0% to about 80% by volume. The semi-solid anode 150 can include an anode active material such as, for example, lithium metal, carbon, lithium-intercalated carbon, lithium nitrides, lithium alloys and lithium alloy forming compounds of silicon, bismuth, boron, gallium, indium, zinc, tin, tin oxide, antimony, aluminum, titanium oxide, molybdenum, germanium, manganese, niobium, vanadium, tantalum, gold, platinum, iron, copper, chromium, nickel, cobalt, zirconium, yttrium, molybdenum oxide, germanium oxide, silicon oxide, silicon carbide, any other materials or alloys thereof, and any other combination thereof.

The semi-solid anode 150 can also include a conductive material which can be a carbonaceous material such as, for example, graphite, carbon powder, pyrolytic carbon, carbon black, carbon fibers, carbon microfibers, carbon nanotubes (CNTs), single walled CNTs, multi walled CNTs, fullerene carbons including "bucky balls", graphene sheets and/or aggregate of graphene sheets, any other carbonaceous material or combination thereof. In some embodiments, the semi-solid anode 150 can also include a non-aqueous liquid electrolyte such as, for example, ethylene carbonate, dim-ethyl carbonate, diethyl carbonate, or any other electrolyte described herein or combination thereof.

In some embodiments, the semi-solid cathode 140 and/or the semi-solid anode 150 can include active materials and optionally conductive materials in particulate form suspended in a non-aqueous liquid electrolyte. In some embodiments, the semi-solid cathode 140 and/or the semi-solid anode 150 particles (e.g., cathodic or anodic particles) can have an effective diameter of at least about 1 µm. In some embodiments, the cathodic or anodic particles have an effective diameter between about 1 µm and about 10 µm. In some embodiments, the cathodic or anodic particles have an effective diameter of at least about 10 µm or more. In some embodiments, the cathodic or anodic particles have an effective diameter of less than about 1 µm. In some embodiments, the cathodic or anodic particles have an effective diameter of less than about 0.5 µm. In some embodiments, the cathodic or anodic particles have an effective diameter of less than about 0.25 µm. In some embodiments, the cathodic or anodic particles have an effective diameter of less than about 0.1 µm. In some embodiments, the cathodic or anodic particles have an effective diameter of less than about 0.05 µm. In other embodiments, the cathodic or anodic particles have an effective diameter of less than about 0.01 µm.

In some embodiments, the semi-solid cathode 140 can include about 20% to about 80% by volume of an active material. In some embodiments, the semi-solid cathode 140 can include about 40% to about 75% by volume, about 50% to about 75% by volume, about 60% to about 75% by volume, or about 60% to about 80% by volume of an active material.

In some embodiments, the semi-solid cathode 140 can include about 0% to about 25% by volume of a conductive material. In some embodiments, the semi-solid cathode 140 can include about 1.0% to about 6% by volume, about 6% to about 12%, or about 2% to about 15% by volume of a conductive material.

In some embodiments, the semi-solid cathode 140 can include about 20% to about 70% by volume of an electrolyte. In some embodiments, the semi-solid cathode 140 can include about 30% to about 60%, about 40% to about 50%, or about 20% to about 40% by volume of an electrolyte.

In some embodiments, the semi-solid anode 150 can include about 20% to about 80% by volume of an active material. In some embodiments, the semi-solid anode 150 can include about 40% to about 75% by volume, about 50% to about 75%, about 60% to about 75%, or about 60% to about 80% by volume of an active material.

In some embodiments, the semi-solid anode 150 can include about 0% to about 20% by volume of a conductive material. In some embodiments, the semi-solid anode 150 can include about 1% to about 10%, 1% to about 6%, about 0.5% to about 2% by volume, about 2% to about 6%, or about 2% to about 4% by volume of a conductive material.

In some embodiments, the semi-solid anode 150 can include about 20% to about 70% by volume of an electrolyte. In some embodiments, the semi-solid anode 150 can include about 30% to about 60%, about 40% to about 50%, or about 20% to about 40% by volume of an electrolyte.

Examples of active materials, conductive materials, and/or electrolytes that can be used in the semi-solid cathode 140 and/or the semi-solid anode 150 compositions, various formulations thereof, and electrochemical cells formed therefrom, are described in the '159 patent, U.S. Pat. No. 8,722,226 (also referred to as "the 226 patent"), issued May 13, 2014, entitled "High Energy Density Redox Flow Device," and U.S. Patent Publication No. 2011/0200848 (also referred to as "the '848 publication"), filed Dec. 16, 2010, entitled "High Energy Density Redox Flow Device," the entire disclosures of which are hereby incorporated by reference.

In some embodiments, the semi-solid anode 150 can also include about 1% to about 30% by volume of a high capacity material. Such high capacity materials can include, for example, silicon, bismuth, boron, gallium, indium, zinc, tin, antimony, aluminum, titanium oxide, molybdenum, germanium, manganese, niobium, vanadium, tantalum, iron, copper, gold, platinum, chromium, nickel, cobalt, zirconium, yttrium, molybdenum oxide, germanium oxide, silicon oxide, silicon carbide, any other high capacity materials or alloys thereof, and any combination thereof. In some embodiments, the semi-solid can include about 1% to about 5% by volume, about 1% to about 10% by volume, or about 1% to about 20% by volume of the high capacity material. Examples of high capacity materials that can be included in the semi-solid anode 150, various formulations thereof and electrochemical cells formed therefrom, are described in the '097 publication.

While described herein as including a semi-solid cathode 140 and a semi-solid anode 150, in some embodiments, the electrochemical cell 100 can include only one semi-solid electrode. For example, in some embodiments, the cathode 140 can be a semi-solid cathode and the anode 150 can be a conventional solid anode (e.g., a high capacity solid anode). Similarly, in some embodiments, the cathode 140 can be a solid cathode and the anode 150 can be semi-solid anode.

In some embodiments, the electrolyte included in the at least one of the semi-solid cathode 140 and/or the semi-solid anode 150 can include about 0.1% to about 1% by weight of a gel-polymer additive. Examples of gel polymer additives that can be included in the semi-solid cathode 140 and/or semi-solid anode 150 formulation, and electrochemical cells therefrom are described in the '279 publication.

In some embodiments, the cathode 140 and/or anode 150 semi-solid suspensions can initially be flowable, and can be caused to become non-flowable by "fixing". In some embodiments, fixing can be performed by the action of photopolymerization. In some embodiments, fixing is performed by action of electromagnetic radiation with wavelengths that are transmitted by the unfilled positive and/or negative electroactive zones of the electrochemical cell 100 formed from a semi-solid cathode and/or semi-solid anode. In some embodiments, the semi-solid suspension can be fixed by heating. In some embodiments, one or more additives are added to the semi-solid suspensions to facilitate fixing.

In some embodiments, the injectable and flowable semi-solid cathode 140 and/or semi-solid anode 150 is caused to become non-flowable by "plasticizing". In some embodiments, the rheological properties of the injectable and flowable semi-solid suspension are modified by the addition of a thinner, a thickener, and/or a plasticizing agent. In some embodiments, these agents promote processability and help retain compositional uniformity of the semi-solid suspension under flowing conditions and positive and negative electroactive zone filling operations. In some embodiments, one or more additives are added to the flowable semi-solid suspension to adjust its flow properties to accommodate processing requirements.

Systems employing negative and/or positive ion-storage materials that are storage hosts for working ions, meaning that said materials can take up or release the working ion while all other constituents of the materials remain substantially insoluble in the electrolyte, are particularly advantageous as the electrolyte does not become contaminated with electrochemical composition products. In addition, systems employing negative and/or positive lithium ion-storage materials are particularly advantageous when using non-aqueous electrochemical compositions.

In some embodiments, the semi-solid ion-storing redox compositions include materials proven to work in conventional lithium-ion batteries. In some embodiments, the positive semi-solid electroactive material contains lithium positive electroactive materials and the lithium cations are shuttled between the negative electrode and positive electrode, intercalating into solid, host particles suspended in a liquid electrolyte.

The semi-solid cathode 140 is coated on only one side of the positive current collector 110. Similarly, the semi-solid anode 150 is coated on only one side of the negative current collector 120. For example, the semi-solid electrodes can be casted, drop coated, pressed, roll pressed, or otherwise disposed on the current collectors using any other suitable method. Coating the semi-solid electrodes on only one side of the current collectors can substantially reduce the time period for forming the electrochemical cell 100. This can substantially reduce evaporation of the electrolyte included in the semi-solid cathode 140 and/or the semi-solid anode 150 slurry formulations. Furthermore, exposure of the electrolyte to the moisture present in the ambient environment can be minimized, thereby preventing degradation of the electrolyte.

A plurality of the electrochemical cell 100 can be disposed in a cell stack to form an electrochemical cell stack. For example, the electrochemical cell 100 can be a first electrochemical cell 100. The cell stack can include a second electrochemical cell (not shown) and a third electrochemical cell (not shown). Each of the second electrochemical cell and the third electrochemical cell can be substantially similar to the first electrochemical cell 100. An uncoated surface of a positive current collector 110 included in the second electrochemical cell can be disposed on an uncoated surface of the positive current collector 110 included in first electrochemical cell 100. Similarly, an uncoated surface of a negative current collector 120 included in the third electrochemical cell can be disposed on an uncoated surface of the negative current collector 120 included in first electrochemical cell 100. Any number of electrochemical cells 100 can be included in the cell stack. Stacking the plurality of the electrochemical cells 100 as described herein significantly reduces the time required to form the electrochemical cell stack. This can minimize evaporation and/or degradation of the electrolyte as described herein.

Figure 2:
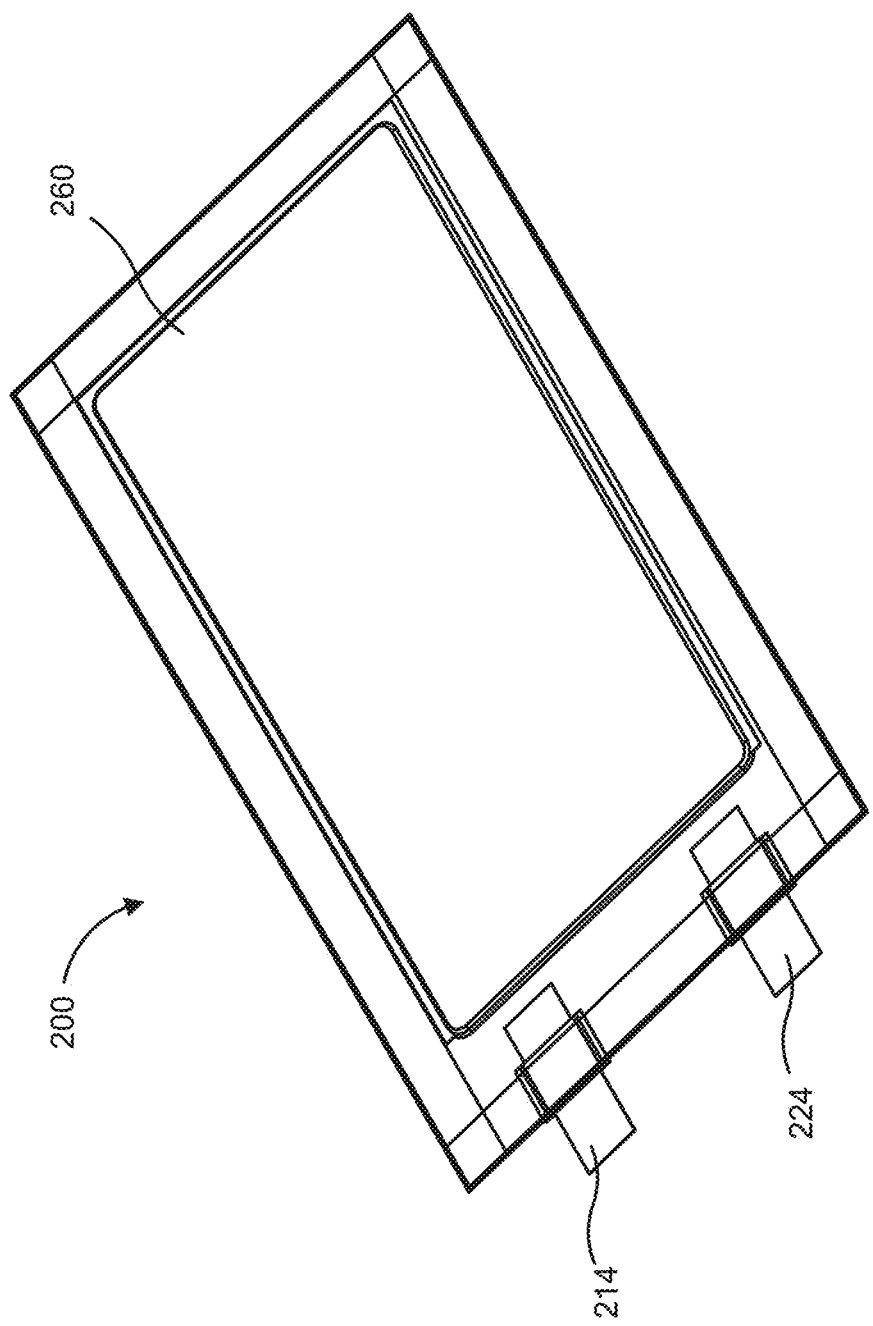
FIG. 2 is a perspective view of an electrochemical cell in a pouch according to an embodiment.
Figure 3:
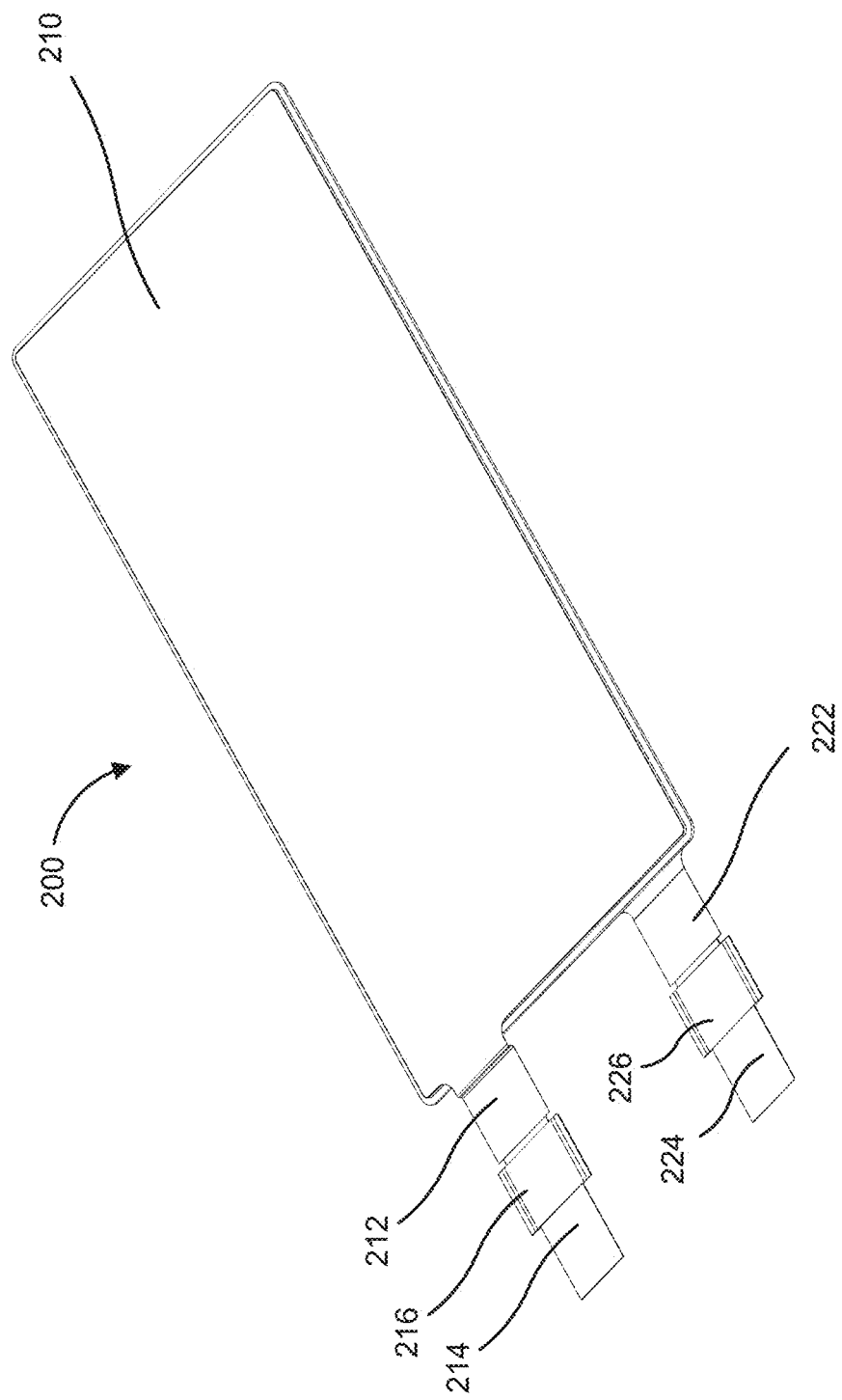
FIG. 3 shows the electrochemical cell of FIG. 2, with a pouch removed.
Figure 4:
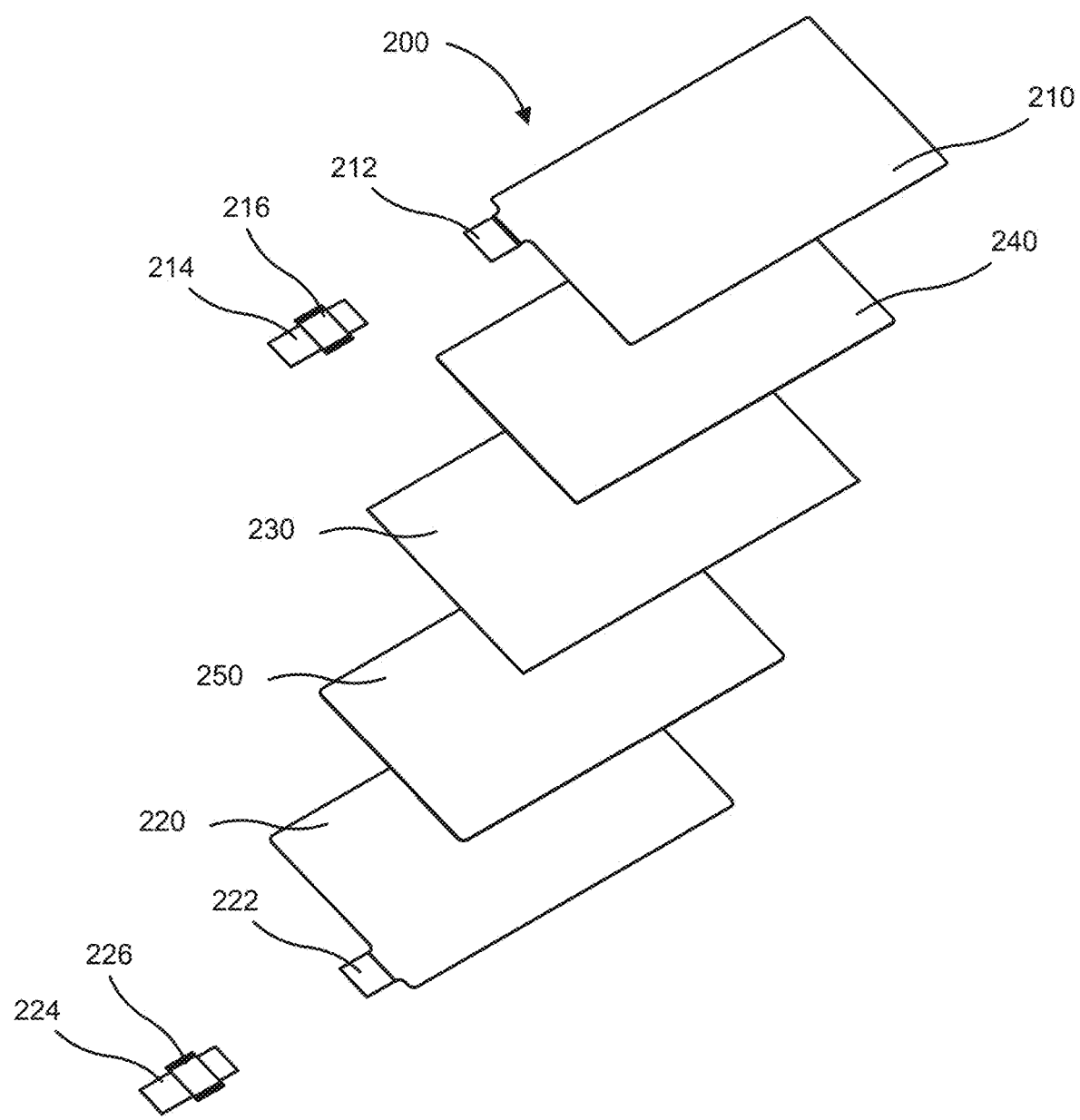
FIG. 4 is an exploded view of the electrochemical cell of FIG. 3.

FIGS. 2-4 show an electrochemical cell 200 that includes a positive current collector 210 and a negative current collector 220. A semi-solid cathode 240 is disposed on the positive current collector 210 and a semi-solid anode 250 is disposed on the negative current collector 220. A separator 230 is disposed between the semi-solid cathode 240 and the semi-solid anode 250. The electrochemical cell 200 is disposed in a pouch 260.

The positive current collector 210 can be formed from a metal foil, for example, a copper or aluminum foil, or any other materials described with respect to the positive current collector 210 included in the electrochemical cell 200. The positive current collector 210 can have a thickness in the range of about 20 μm to about 40 μm, for example, about 25 μm, about 30 μm, or about 35 μm, inclusive of all ranges therebetween. In some embodiments, the positive current collector 210 can have a thickness of less than about 20 μm, for example, about 5 μm, 6 μm, 7 μm, 8 μm, 9 μm, 10 μm, 12 µm, 14 µm, 16 µm, or about 18 µm, inclusive of all ranges therebetween. The positive current collector 210 includes a tab 212 that is coupled with a positive lead 214. In some embodiments, the tab 212 can be cut to a desired length for coupling with the positive lead 214. The positive lead can be a strip of a conducting metal (e.g., copper or aluminum) which can be coupled to the tab 212 using any suitable method, for example, ultrasonic welding, clamping, crimping, adhesive tape, and the likes. A ring 216 is wrapped around a portion of the positive lead 214 and is aligned with an edge of the pouch 260 when the electrochemical cell 200 is disposed in the pouch 260. Thus when the pouch 260 is sealed, the ring 216 ensures that the pouch 260 is thermally sealable. The ring 216 can be formed from an insulating material, for example a select plastic such as Surlyn, or any other suitable material.

The negative current collector 220 can be formed from a metal foil, for example, a copper or aluminum foil, or any other materials described with respect to the negative current collector 220 included in the electrochemical cell 200. The negative current collector 220 can have a thickness in the range of about 20 µm to about 40 µm, for example, about 25 µm, about 30 µm, or about 35 µm, inclusive of all ranges therebetween. In some embodiments, the negative current collector 220 can have a thickness of less than about 20 µm, for example, about 5 µm, 6 µm, 7 µm, 8 µm, 9 µm, 10 µm, 12 µm, 14 µm, 16 µm, or about 18 µm, inclusive of all ranges therebetween. The negative current collector 220 also includes a tab 222 that is coupled with negative lead 224. In some embodiments, the tab 222 can be cut to a desired length for coupling with the negative lead 224. The negative lead 224 can be substantially similar to the positive lead 214, and is not described in further detail herein. A ring 226 is wrapped around a portion of the negative lead 224 and is aligned with an edge of the pouch 260 when the electrochemical cell 200 is disposed in the pouch 260. Thus when the pouch 260 is sealed, the ring 226 ensures that the pouch 260 is thermally sealable. The ring 226 can be formed from an insulating material, for example a select plastic such as Surlyn, or any other suitable material.

The separator 230 can be an ion-permeable membrane and can be formed from any of the materials described with respect to the separator 230 included in the electrochemical cell 200. The separator 230 can have a thickness of about 10 µm to about 30 µm, for example, about 15 µm, about 20 µm, or about 25 µm, inclusive of all ranges therebetween.

The semi-solid cathode 240 is disposed, for example coated, on a first surface of the positive current collector 210 which is proximal to the separator 230. A second surface of the positive current collector 210 distal to the separator 230 is left uncoated. Similarly the semi-solid anode 250 is disposed, for example coated, on a first surface of the negative current collector 220 which is proximal to the separator 230. A second surface of the negative current collector 220 distal to the separator 230 is left uncoated. Said another way, the semi-solid cathode 240 and the semi-solid anode 250 are coated on only one side of the positive current collector 210 and the negative current collector 220, respectively. Coating only one side reduces the time required to prepare the electrochemical cell 200. This can reduce the evaporation and/or degradation (e.g., due to ambient humidity) of an electrolyte included in the semi-solid cathode 240 and/or the semi-solid anode 250 formulations. The semi-solid cathode 240 and the semi-solid anode 250 can be formulated using any components (e.g., active materials and/or conductive materials, additives, gel polymers, etc.) as described with respect to the semi-solid cathode 140 and the semi-solid anode 150 included in the electrochemical cell 100, respectively. Moreover, each of the semi-solid cathode 240 and/or the semi-solid anode 250 can have a thickness of at least about 250 µm. For example, the semi-solid cathode 240 and/or the semi-solid anode 250 can have a thickness in the range of about 250 µm to about 2,000 µm.

The prepared electrochemical cell 200 can be vacuum sealed in a prismatic pouch 260 which can provide hermetic isolation of the electrochemical cell 200 materials from the environment. Thus, the pouch 260 can serve to avoid leakage of hazardous materials such as electrolyte solvents and/or corrosive salts to the ambient environment, and can prevent water and/or oxygen infiltration into the cell. Other functions of the pouch 260 can include, for example, compressive packaging of the internal layers, voltage isolation for safety and handling, and mechanical protection of the electrochemical cell 200 assembly.

Typical pouch materials can include laminates (e.g., multi-layer sheets), formed into, for example, two or three solid film-like layers and bound together by adhesive. The word "laminate" as used herein can also refer to layers of material that are not chemically adhered to one another. For example, the layers can be in areal contact with each other and coupled using other coupling methods, such as, for example, heat sealing. In some embodiments, the pouch 260 can formed from polypropylene, for example, cast propylene. In some embodiments, an electrochemical cell can be formed having a casing or pouch that includes multi-layer laminate sheets that include at least a first or inner layer formed with a plastic material and a second layer formed with an electronically conducting material such that the multi-layer sheet can be used as an electrochemically functional element of the cell. For example, in some embodiments, the electronically conducting material (e.g., metal foil) of a pouch can be used as a current collector for the cell. In some embodiments, the metal foil can be used as a pass-through tab. Thus, the multi-layer or laminate sheet(s) of the cell pouch can be used as an electrochemically functional material of the cell, in addition to acting as a packaging material. Systems, devices, and methods of manufacturing an electrochemical cell having a casing or pouch that includes multi-layer laminate sheets are described in U.S. Patent Publication No. 2015/0171406 (also referred to as "the '406 publication"), filed Nov. 17, 2014, entitled "Electrochemical Cells and Methods of Manufacturing the Same," the entire disclosure of which is hereby incorporated by reference.

Figure 5:
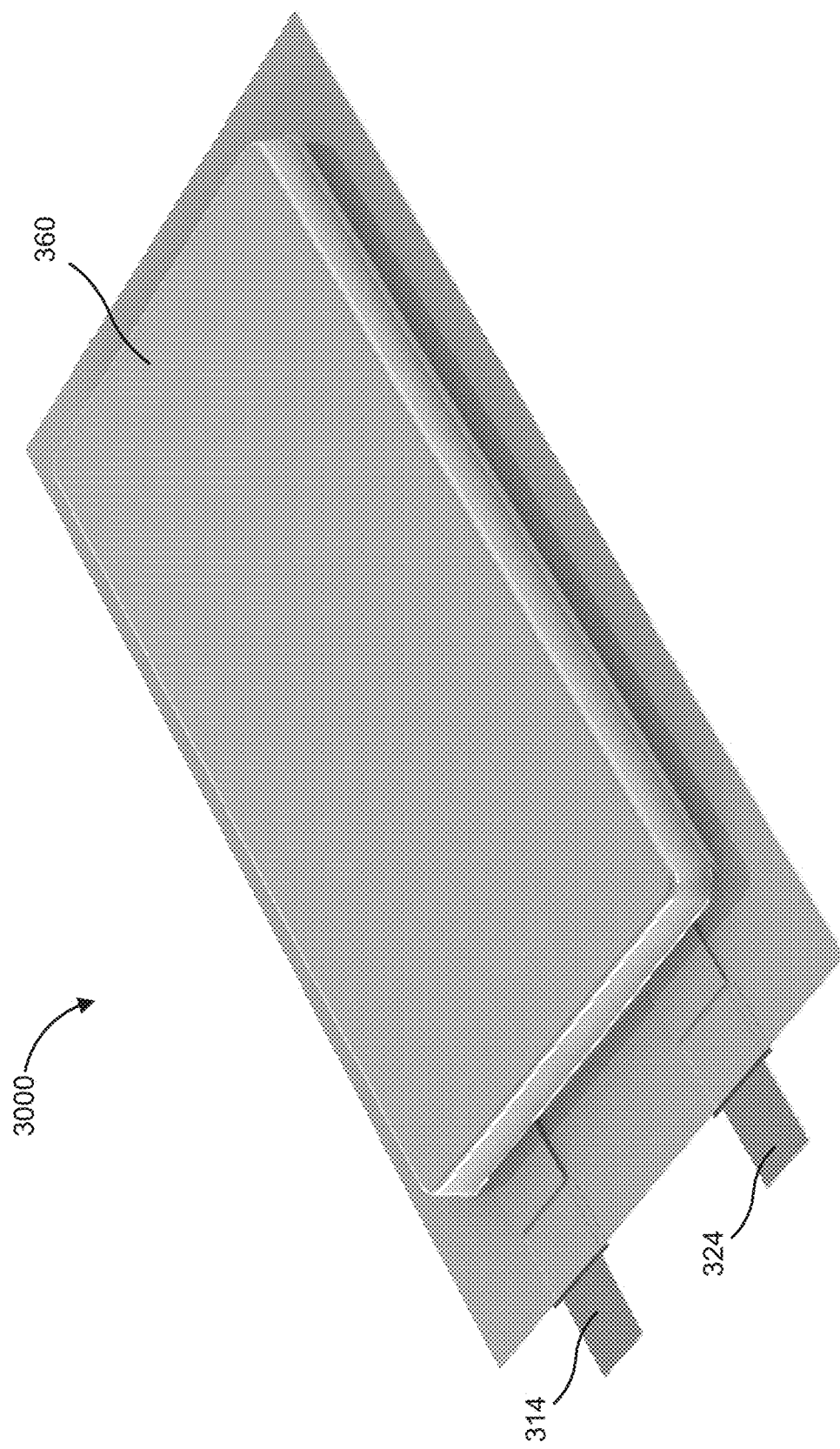
FIG. 5 shows an electrochemical cell stack in a pouch that includes a plurality of electrochemical cells, according to an embodiment.
Figure 6:
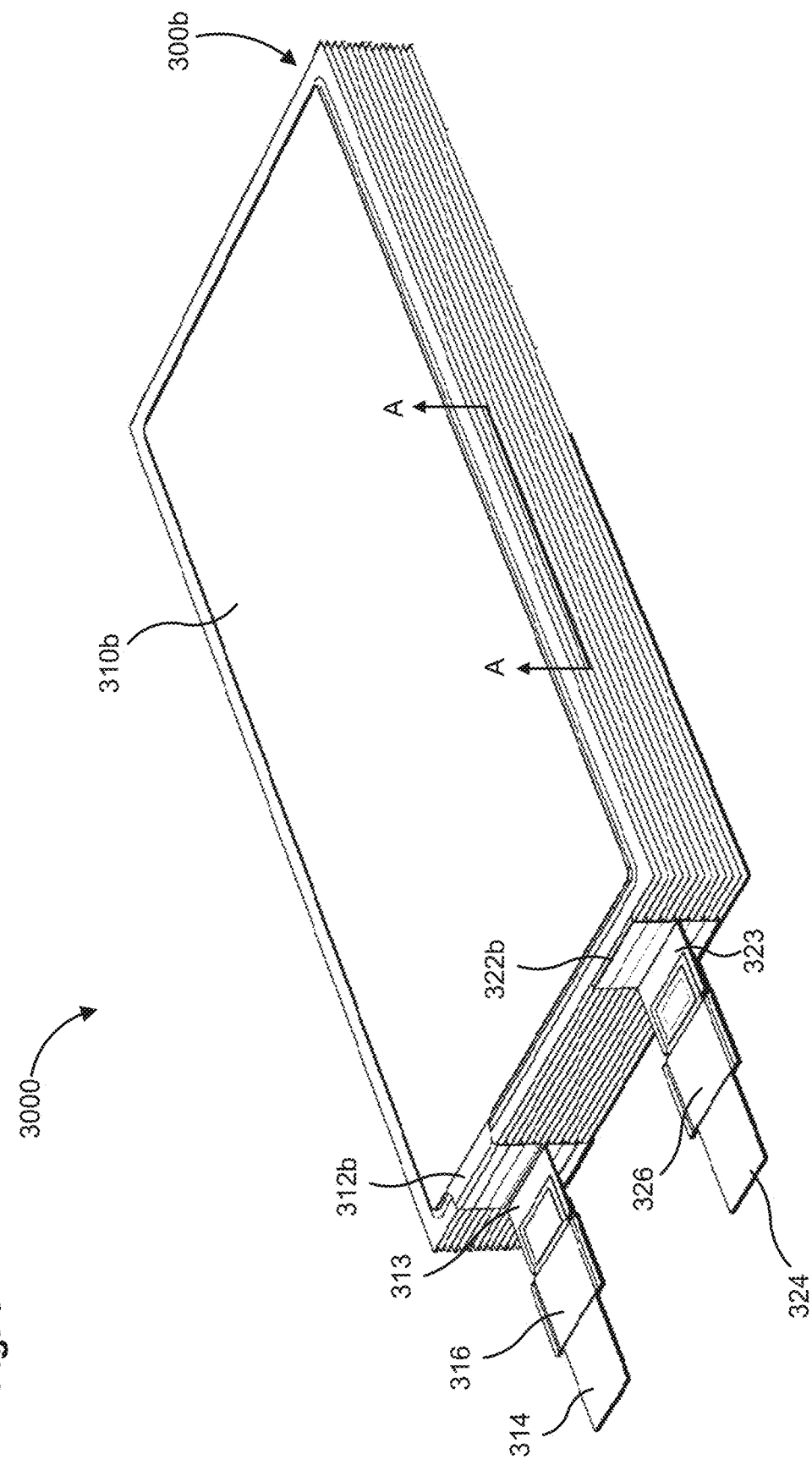
FIG. 6 shows the electrochemical cell stack of FIG. 5 with a pouch removed.
Figure 7:
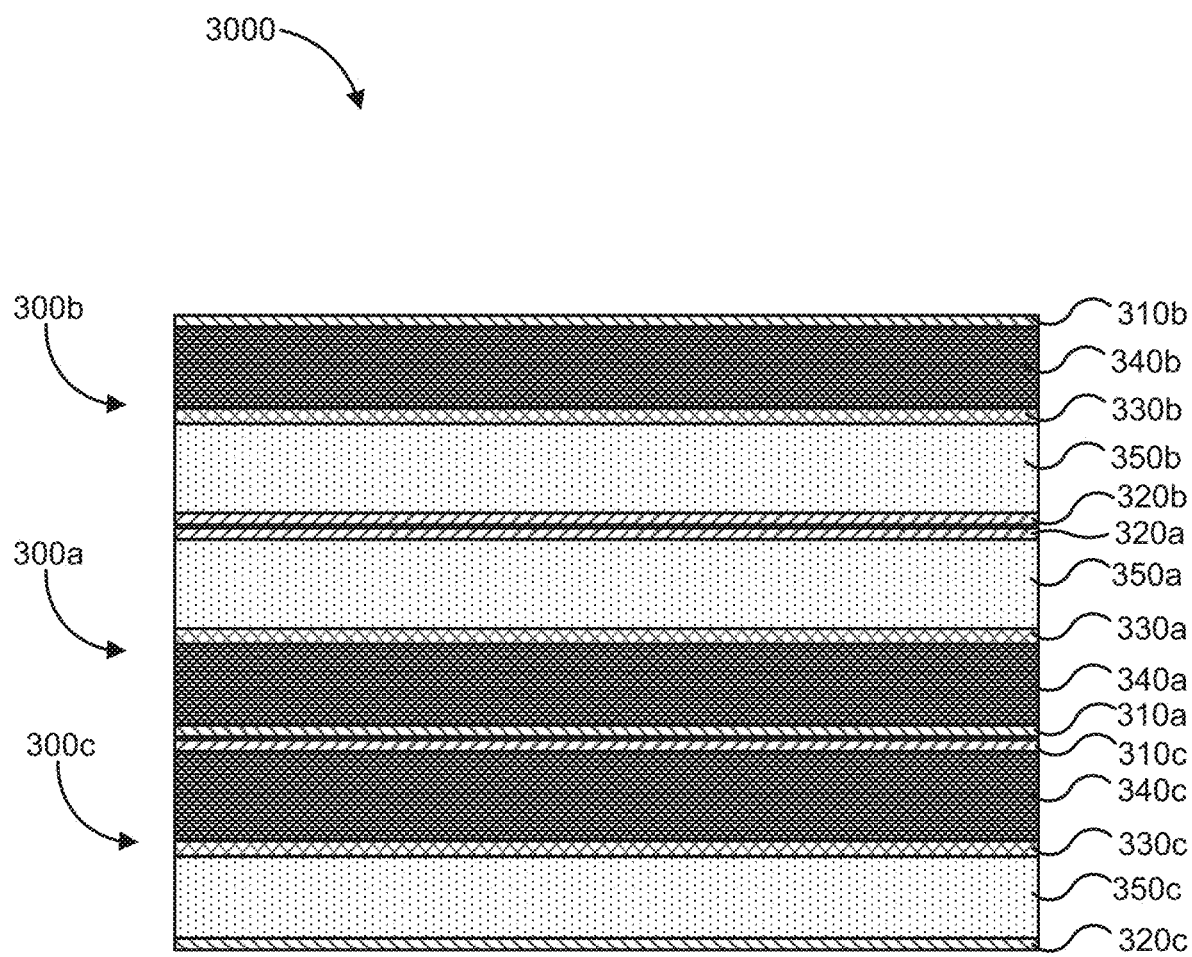
FIG. 7 shows a side cross-section of the electrochemical cell stack shown of FIG. 5, taken along the line AA as shown in FIG. 6.

A plurality of electrochemical cells 200, or any other electrochemical cells described herein can be disposed in an electrochemical cell stack, for example, to form an electrochemical battery. Referring now to FIGS. 5-7 an electrochemical cell stack 3000 is shown that includes a plurality of electrochemical cells disposed therein. The electrochemical cell stack 3000 can be disposed in a pouch 360, for example a vacuum sealed pouch which can be substantially similar to the pouch 260 described with respect to FIGS. 2-4, and therefore, is not described in further detail herein.

Each of the plurality electrochemical cell included in the electrochemical cell stack 3000, for example a second electrochemical cell 300b (FIG. 6) can be substantially similar to the electrochemical cell 100, or 200. Each of the current collectors included in the plurality of electrochemical cells includes a tab. For example, as shown in FIG. 6, a positive current collector 310b (FIG. 7) of the second electrochemical cell 300b includes a tab 312b and a negative current collector 320b of the second electrochemical cell 300b includes a tab 322b. Each of the tabs of the positive current collectors included in the plurality of electrochemical cells are coupled together in a positive bail 313, which is then coupled to a positive lead 314. In some embodiments, each of the tabs of the positive current collectors can be bent over one another to form the positive bail 313. In some embodiments, the tabs included in the positive bail 313 can be cut to a desired length for coupling with the positive lead 314. In some embodiments, the positive current collectors 310 and/or the negative current collectors 320 included in the cells 300 disposed towards the interior of the cells can have tabs that are substantially shorter than the tabs 312 of the positive current collectors 310 and/or the tabs 322 of the negative current collectors 320 included in the outermost electrochemical cells 300. For example, the tab of the positive current collector 310c included in the electrochemical cell 300c can be substantially longer than the tabs of the positive current collectors 310a and 310b included in the electrochemical cells 300a and 300b, respectively. Similarly, the tab of the negative current collector 320a included in the electrochemical cell 300a can be substantially longer than the tabs of the negative current collectors 320b and 320c included in the electrochemical cells 300b and 300c, respectively. In such embodiments, the shorter tabs can be coupled to the longer tabs, for example, via ultrasonic welding, clamping, crimping, adhesive tape, and the likes to form the bail (i.e., the bails 313 and 323). The longer tabs of the outermost positive current collector and the outermost negative current collector (e.g., the positive current collector 310c and the negative current collector 310a) can then be coupled to the positive lead 314 and the negative lead 324. In this manner, the amount of material required to form the tabs can be reduced, thereby reducing the cost and/or overall weight of the electrochemical cells 300. In some embodiments, the tabs of the positive current collectors 310 and the negative current collectors of the innermost electrochemical cells 300 can be longer than tabs 310 and 320 of the positive current collectors 310 and the negative current collectors 320 of the remaining electrochemical cells included in the electrochemical cell stack 3000. In some embodiments, the positive current collector 310 and/or the negative current collector 320 that includes the longer tab can be substantially thicker than the positive current collectors 310 and/or negative current collectors 320 included in the other electrochemical cells 300 included in the electrochemical cell stack 3000. In some embodiments, each of the positive current collectors 310 and the negative current collectors 320 can have tabs that can be sufficient long (e.g., about the same length as the positive tab 312 and the negative tab 322 of the outermost positive current collector 310 and the outermost negative current collector 320, respectively) to extend out of the pouch 360. In such embodiments, for example, the tabs of the each of the positive current collectors 310 can be coupled together, for example, via ultrasonic welding, clamping, crimping, adhesive tape, and the likes to form a positive bail (e.g., the bail 313). Similarly, the tabs of the each of the negative current collectors 320 can be coupled together as described herein, to form a negative bail (e.g., the bail 323). As described herein, the positive bail (including the tabs of each of the positive current collectors) and the negative bail (including the tabs of each of the negative current collectors) can extend out of the pouch and can be used to electrically interface the electrochemical cell stack 3000. Said another way, in such embodiments, the electrochemical cell stack 3000 can be electrically coupled to external electronic components directly via the positive bail and the negative bail such that the positive lead 314 and the negative lead 324 are not included in the electrochemical cell stack.

The positive lead 314 can be strip of a conducting metal (e.g., copper or aluminum) which can be coupled to the positive bail 313 using any suitable method, for example, ultrasonic welding, clamping, crimping, adhesive tape, and the likes. A ring 316 is wrapped around a portion of the positive lead 314 and is aligned with an edge of the pouch 360 when the electrochemical cell 300 is disposed in the pouch 360. Thus when the pouch 360 is sealed, the ring 316 ensures that the pouch 360 is thermally sealable. The ring 316 can be formed from an insulating material, for example a select plastic such as Surlyn, or any other suitable material. Similarly, each of the tabs of the negative current collectors included in the plurality of electrochemical cells are coupled together in a negative bail 323, which is then coupled to a negative lead 324. In some embodiments, each of the tabs of the negative current collectors can be bent over one another to form the negative bail 323. In some embodiments, the tabs included in the negative bail 323 can be cut to a desired length for coupling with the positive lead 314. The negative lead 324 can be substantially similar to the positive lead 314, and is therefore, not described in further detail herein. Furthermore, ring 326 is wrapped around a portion of the negative lead 324 and is aligned with an edge of the pouch 360 when the electrochemical cell 300 is disposed in the pouch 360. The ring 326 can be substantially similar to the ring 316, and is therefore, not described in further detail herein.

FIG. 7 shows the side cross-section of a portion of the electrochemical cell stack 3000 taken along line AA (FIG. 6). The portion of the electrochemical cell stack 3000 includes a first electrochemical cell 300a, the second electrochemical cell 300b and a third electrochemical cell 300c. The first electrochemical cell 300a includes a first positive current collector 310a, a first negative current collector 320a and a first separator 330a. A first semi-solid cathode 340a is disposed on only one side of the first positive current collector 310a that faces the first separator 330a. Similarly, a first semi-solid anode 350a is disposed on only one side of the first negative current collector 320a that faces the first separator 330a. The first separator 330a is disposed between the first semi-solid cathode 340a and the first semi-solid anode 350a.

The second electrochemical cell 300b includes a second positive current collector 310b, a second negative current collector 320b and a second separator 330b. A second semi-solid cathode 340b is disposed on only one side of the second positive current collector 310b that faces the second separator 330b. Similarly, a second semi-solid anode 350b is disposed on only one side of the second negative current collector 320b that faces the second separator 330b. The second separator 330b is disposed between the second semi-solid cathode 340b and the second semi-solid anode 350b.

The third electrochemical cell 300c includes a third positive current collector 310c, a third negative current collector 320c and a third separator 330c. A third semi-solid cathode 340c is disposed on only one side of the third positive current collector 310c that faces the third separator 330c. Similarly, a third semi-solid anode 350c is disposed on only one side of the third negative current collector 320c that faces the third separator 330c. The third separator 330c is disposed between the third semi-solid cathode 340c and the third semi-solid anode 350c.

The first electrochemical cell 300a, the second electrochemical cell 300b, and the third electrochemical cell 300c can be substantially similar to each other. The positive current collectors, the negative current collectors, and the separators included in each of the electrochemical cells included in the electrochemical cell stack 3000 can be formed from any materials described with respect to the positive current collector 110, the negative current collector 120, and the separator 130 included in the electrochemical cell 100. Furthermore, the semi-solid cathode and the semi-solid anode included in each of the electrochemical cells of the electrochemical cell stack 3000 can be formulated using any materials or methods described with respect to the semi-solid cathode 140 and the semi-solid anode 150 included in the electrochemical cell 100.

The second electrochemical cell 300b is disposed on the first electrochemical 300a such that an uncoated side of the second positive current collector 310b is adjacent and abuts an uncoated side of the first positive current collector 310a. Similarly, the third electrochemical cell 300c is disposed on the first electrochemical cell 300a such that an uncoated side of the third negative current collector 320c is adjacent to and abuts an uncoated side of the first negative current collector 320a. While the electrochemical cell stack 3000 is shown as including eight electrochemical cells (FIG. 6), any number of electrochemical cells can be included in the electrochemical cell stack 3000. While not shown herein, in some embodiment, a spacer, for example, an electrical and/or heat insulating spacer can be disposed between each adjacent electrochemical cell. In some embodiments, the spacer can be configured to apply a stack pressure on the each of the electrochemical cells included in the electrochemical cell stack 3000. Suitable spacers can include, for example, a foam pad, a rubber pad, a plastic sheet, a paper or cardboard strip, and the likes.

In comparison with conventional electrochemical cell stacks, the electrochemical cells stack 3000 can be formed in a smaller period of time. This can minimize evaporation and/or degradation of the electrolyte, as described herein. The electrochemical cell stack 3000 can have a smaller ratio of active material to inactive material, when compared with a similar sized electrochemical cell stack that includes the semi-solid electrodes described herein coated on both sides of current collectors. However, compared with conventional electrochemical cell stacks, that include conventional electrodes coated on both sides of current collectors, the electrochemical cell stack can still have a higher ratio of active material to inactive material. This is because the semi-solid electrodes can be made much thicker, for example in the range of about 250 μm to about 2,000 μm, in comparison to conventional electrodes that can generally not be made thicker than about 200 μm. Thus, the electrochemical cell stack 3000 can yield a desired energy density and charge capacity with a fewer number of electrochemical cells (e.g., the electrochemical cell 300) included in the electrochemical cell stack 3000 in comparison with a conventional electrochemical cell stack that yields a comparable energy density and charge capacity. Furthermore, the single side coated electrochemical cells 300 included in the electrochemical cell stack 300 can include safety or protective features that cannot be included in conventional cells. For example, a safety perimeter or wall can be disposed around the edges of the current collectors (i.e., the positive current collectors 310 and the negative current collectors 320) included in the electrochemical cell stack 3000 to protect the semi-solid cathode 230 and the semi-solid anode 240. Moreover, slight misalignment between adjacent electrochemical cells included in the electrochemical cell stack 3000 can be tolerated such that electrochemical cell stack 3000 can be formed in a shorter amount of time as compared to conventional electrochemical cell stacks.

In some embodiments, an electrochemical cell stack can include a plurality of cell stacks which includes a plurality of positive and negative current collectors. One of the plurality of positive current collectors and one of the plurality of negative current collectors can have tabs which are substantially longer than the tabs of the remaining current collectors and can extend out of the electrochemical cell pouch for interface with external electronics such that no leads are required. For example, referring now to FIG. 8, an electrochemical cell stack 4000 is shown that includes a plurality of electrochemical cells disposed therein. The electrochemical cell stack 4000 can be disposed in a pouch (not shown), for example a vacuum sealed pouch which can be substantially similar to the pouch 260 described with respect to FIGS. 2-4.

Figure 8:
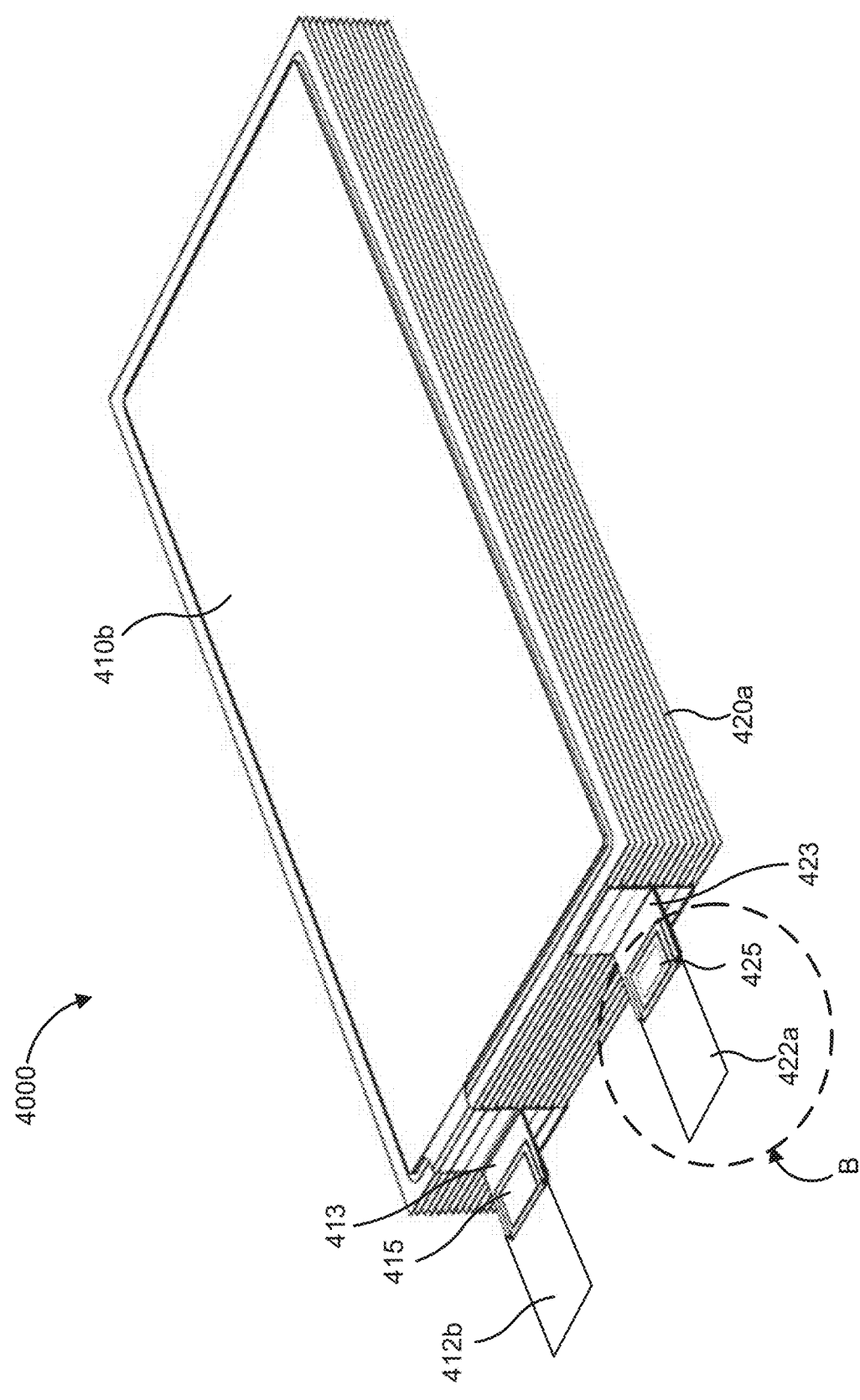
FIG. 8 is a perspective view of an electrochemical cell stack that includes one positive current collector and one negative current collector that have tabs which are substantially longer than the tabs of the remaining positive and negative current collectors, according to an embodiment.

Each of the plurality electrochemical cell included in the electrochemical cell stack 4000 can be substantially similar to the electrochemical cell 100, 200, or 300, and is therefore not described in further detail herein. Each of the current collectors included in the plurality of electrochemical cells includes a tab. For example, as shown in FIG. 8, an outermost positive current collector 410b can include a tab 412b which is substantially longer than the tabs of the remaining positive current collectors. The tabs of the positive current collectors can be coupled together in a bail 413 and coupled to each other using a coupling mechanism 413 such as, for example, ultrasonic welding, clamping, crimping, adhesive tape, and the likes. Similarly, an outermost negative current collector 420a can include a tab 422a which is substantially longer than the tabs of the remaining negative current collectors. The tabs of the negative current collectors can be coupled together in a bail 423 and coupled to each other using a coupling mechanism 425 such as, for example, ultrasonic welding, clamping, crimping, adhesive tape, and the likes. In this manner, each of the tabs of the positive current collectors and the negative current collectors are electronically coupled to each other such that the tab 412b of the positive current collector 410b, and the tab 422a of the negative current collector 420b, each of which are substantially longer than the remaining tabs, extend out of the bail and out of the pouch. Thus, the positive tab 412b and the negative tab 422a can be used for electronic interface with external electronics such that any extra components (e.g., leads) are not used.

Figure 9:
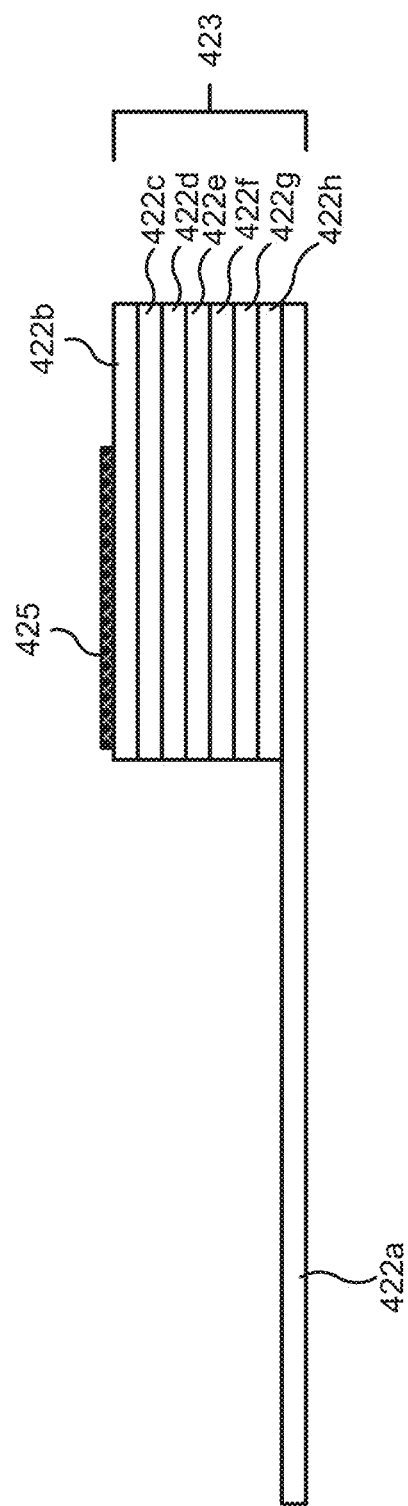
FIG. 9 is a side view of a portion of the electrochemical cell stack of FIG. 8, shown by the arrow B in FIG. 8.

Expanding further, FIG. 9 shows a side view of a portion of the electrochemical cell stack 4000 shown by the arrow B in FIG. 8, which includes the bail of negative current collectors. The electrochemical cell stack includes 8 cell stacks, each of which includes a positive current collector and a negative current collector. As shown in FIG. 9, the electrochemical cell stack 4000 includes 8 negative current collectors 422a-h. The current collectors are joined together in a bail 423 and coupled to each other using a coupling mechanism 425, as described herein. The negative tab 422a of the negative current collector 420a (FIG. 8) is substantially longer than the negative tabs 422b-h of the remaining negative current collectors. Therefore, the tab 422a can extend beyond the bail and out of the pouch used to package the electrochemical cell stack 4000. In this manner, the tab 422a can be used to interface with electrochemical cell stack 4000 with external electronics, such that each of the negative current collectors included in the electrochemical cell stack 4000 is in electronic communication with external electronics via the tab 422a. Thus, external coupling components, for example, negative leads are not used which makes manufacturing simpler and reduces cost.

Figure 10:
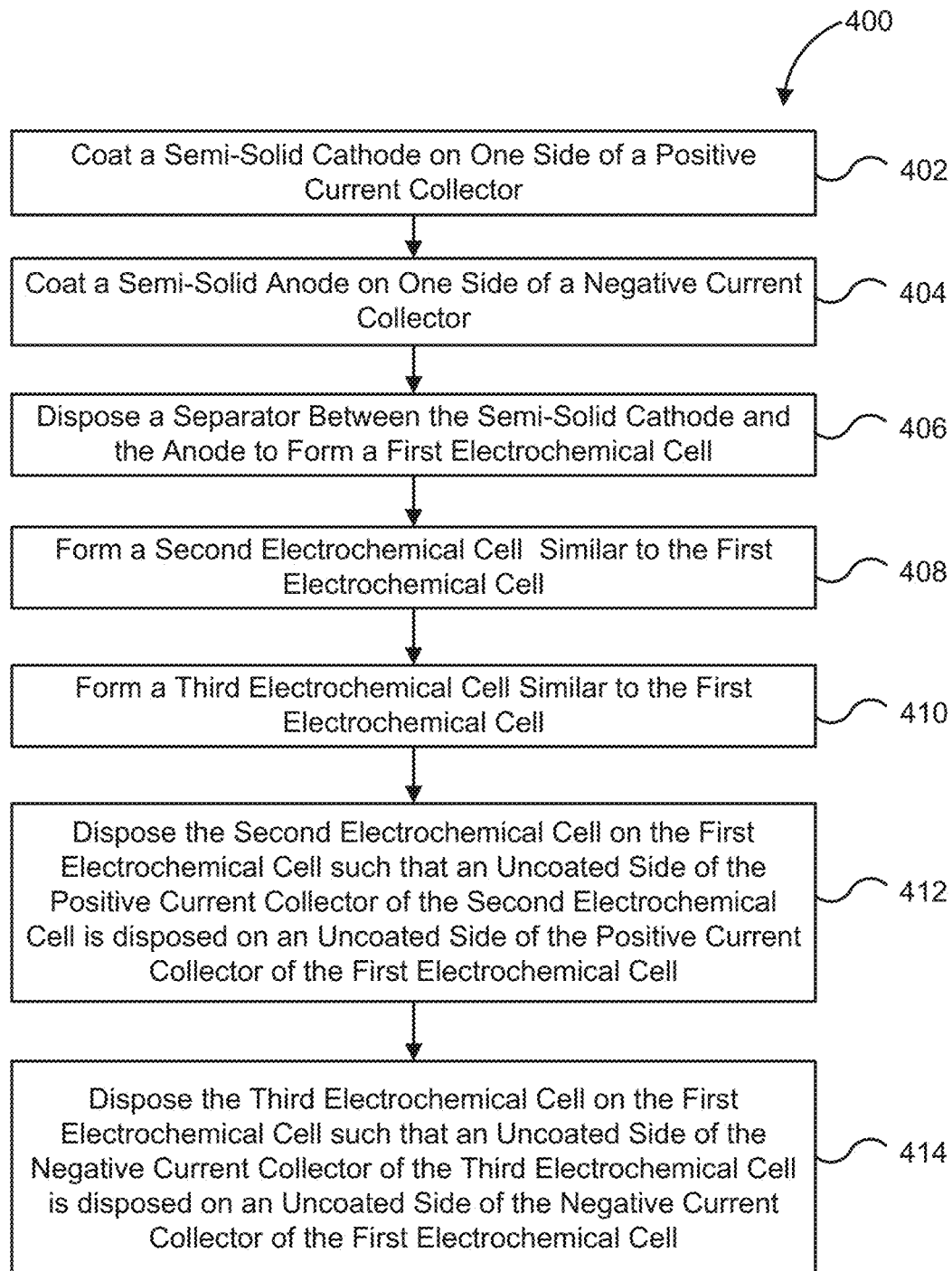
FIG. 10 shows a schematic flow diagram of a method of forming an electrochemical cell stack, according to an embodiment.

FIG. 10 illustrates a flow diagram showing an exemplary method 400 for preparing an electrochemical cell stack that includes a plurality of electrochemical cells. The method 400 includes coating a semi-solid cathode on one side of a positive current collector 402. The semi-solid cathode can include, for example, the semi-solid cathode 140, 240 or any other semi-solid cathode described herein. Suitable positive current collectors can include, for example the positive current collector 110, 210, or any other positive current collector described herein. A semi-solid anode is then coated on only one side of a negative current collector 404. The semi-solid anode can include any of the semi-solid anodes described herein, for example, the semi-solid anode 150, 250, or any other semi-solid anode described herein. Suitable negative current collectors can include, for example, the negative current collector 120, 220, or any other negative current collector described herein. A separator (e.g., the separator 130, 230, or any other separator described herein) is disposed between the semi-solid cathode and the semi-solid anode to form a first electrochemical cell 406. A second electrochemical cell is formed in substantially the same manner as the first electrochemical cell 408. Furthermore, a third electrochemical cell is formed in substantially the same manner as the first electrochemical cell 410. Each of the first electrochemical cell, the second electrochemical cell, and the third electrochemical cell can be substantially similar to the electrochemical cell 100, 200, or any other electrochemical cell described herein.

To form the electrochemical cell stack, the second electrochemical cell is disposed on the first electrochemical cell such that an uncoated side of the positive current collector of the second electrochemical cell is disposed on (e.g., adjacent to or abuts) an uncoated side the positive current collector of the first electrochemical cell 412. Next, the third electrochemical cell is disposed on (e.g., adjacent to or abuts) the first electrochemical cell such that an uncoated side of a negative current collector of the third electrochemical cell is disposed on an uncoated side of the negative current collector of the first electrochemical cell to form the electrochemical cell stack. The electrochemical cell stack can be substantially similar to the electrochemical cell stack 3000, or any other electrochemical cell stack described herein. In some embodiments, the time period required to form the electrochemical cell stack can be sufficiently small such that the evaporation of an electrolyte included in the semi-solid anode or the semi-solid cathode of any of the first electrochemical cell, the second electrochemical cell, and the third electrochemical cell, is substantially reduced.

In some embodiments, the method 400 can optionally include disposing a first spacer between the positive current collector of the first electrochemical cell and the positive current collector of the second electrochemical cell and/or disposing a second spacer between the negative current collector of the third electrochemical cell and the negative current collector of the first electrochemical cell. The spacer can include a heat and/or electrically insulating material such as, for example, a foam pad, a rubber pad, a plastic sheet, a paper or cardboard strip, and the likes.

Figure 11D:
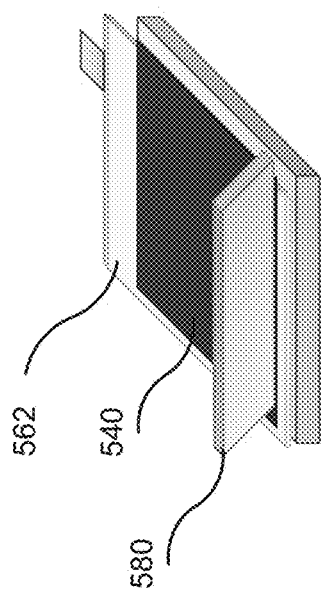

FIGS. 11A-11I illustrate various steps in a process of manufacturing an electrochemical cell 500 having semi-solid electrodes that are coated on only one side of a current collector, according to an embodiment. As shown in. FIG. 11A, a frame 562 (also referred to as "spacer frame") is disposed onto a current collector 510, which includes a power connection tab 512. The current collector 510 can be placed on a holder 565 (also referred to herein as "current collector holder"), for example, that can optionally apply vacuum via a plurality of small holes (not shown) across the surface of the holder 565 so as to hold the current collector 510 in place. The frame 562 has an opening 575 which can expose the underlying current collector 510 when placed on top of the current collector 510.

FIG. 11B illustrates an electrode slurry 540 being disposed onto the exposed portion of the current collector 510 defined by the opening 575 of the frame 562. The opening 575 defines the surface area of the finished electrode 540 and the thickness of the frame 562 defines the thickness of the finished electrode 540. FIGS. 11C and 11D show the electrode slurry 540 being smoothed or spread along the surface of the exposed portion of the current collector 510. In some embodiments, a blade 580 (also referred to herein as "doctor blade") or straight edged instrument can be used to spread the electrode slurry 540. In some embodiments, the blade 580 and/or the holder 565 can be operably coupled to a vibration source (not shown) so as to vibrate the blade 580 or the holder 565 during the electrode slurry 540 deposition or smoothing. The vibration can facilitate dispersion of the semi-solid electrode material 540 during or after the slurry deposition step.

Optionally, an instrument (not shown), such as for example, an optical or any analytical tool using any of non-contact measurement techniques, including optical or laser interferometry, ellipsometry or optical or laser scanning probe to inspect surface morphology and optionally measure surface uniformity (e.g., thickness) of the spread electrode slurry 540. The non-contact instrument can be deployed in situ as the blade 580 spreads the electrode slurry 540.

Figure 11E:
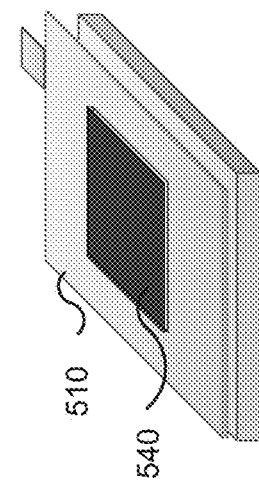
Figure 11F:
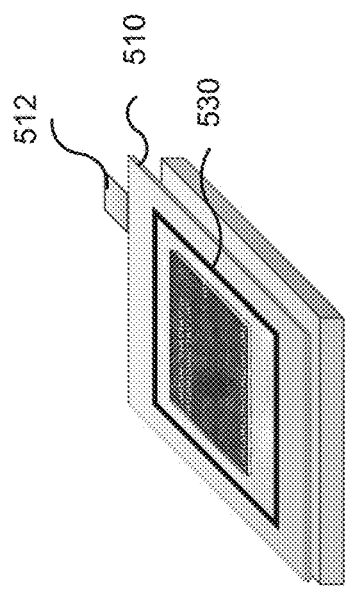

After the electrode slurry 540 is spread, as shown in FIG. 11E, the frame 562 can be removed leaving only the portion of the electrode 540 that has been spread onto the exposed portion of the current collector 510. As illustrated in FIG. 11F, a separator 530 can be placed on the electrode 540 such that the separator 530 is covering the electrode 540.

The manufacturing steps illustrated in FIGS. 11A-11F above cover the deposition step of an electrode onto a current collector. By way of example, the electrode 540 can be a cathode and the current collector 510 can be a positive current collector. The manufacturing steps shown in FIGS. 11A-11E can be repeated for disposing a semi-solid anode 550 onto a negative current collector 520. However, the manufacturing step illustrated in FIG. 11F is performed on only one of the semi-solid cathode deposition step or the semi-solid anode deposition step since a single separator 530 is used in an electrochemical cell 500.

Figure 11I:
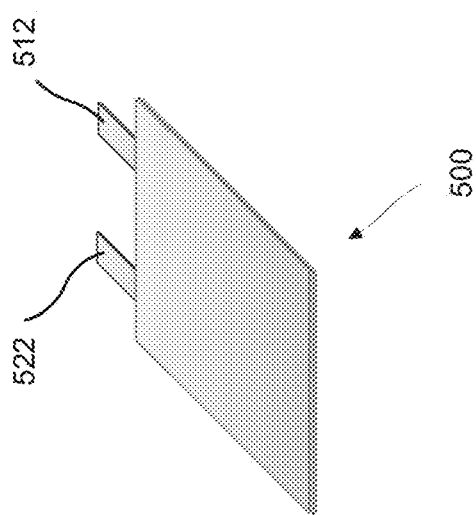
Figure 11H:
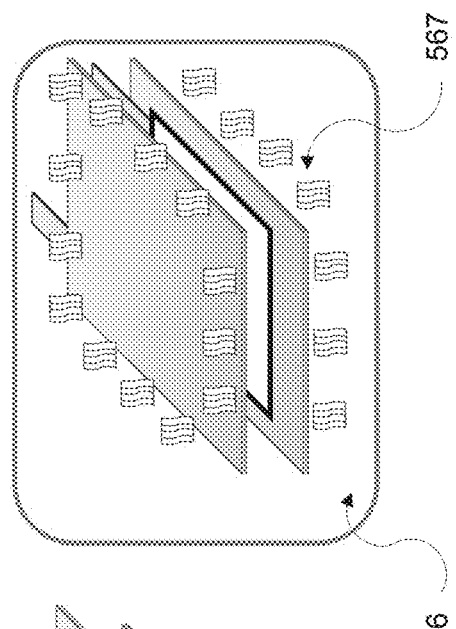
Figure 11G:
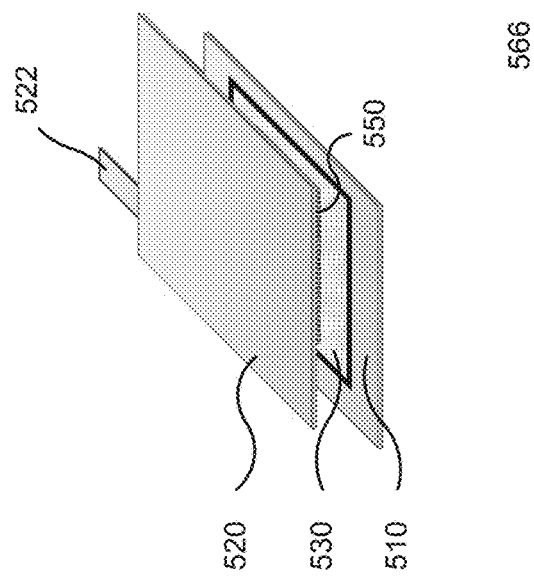

At shown in FIG. 11G, once both the semi-solid cathode 540 and the semi-solid anode 550 are disposed onto their respective current collectors 510 and 520, they can be aligned so that the semi-solid cathode 540 and the semi-solid anode 550 are facing and on top of each other as illustrated, only to be separated by the separator 530. As shown, the semi-solid anode 550 cannot be seen as it is on the underside of the negative current collector 520. The assembled electrode-stack resembles the illustration shown in FIG. 3.

As shown best in FIG. 11H, the electrochemical cell 500 includes a single stack of cathode-separator-anode that is disposed inside a pouch 560, which is then vacuum 566 and heat 567 sealed to form the finished electrochemical cell 500 as shown at FIG. 11I. Whereas the positive current collector 510 includes a power connection tab 512, the negative current collector 520 includes a power connection tab 522.

The finished electrochemical cell 500 in the pouch 560 can be substantially similar to the electrochemical cell 200 shown in FIG. 2. In some embodiments, a plurality of electrochemical cells 500 can be stacked to form an electrochemical cell stack, which can be substantially similar to the electrochemical cell stack 3000 illustrated in FIGS. 5-7.

While various embodiments of the system, methods and devices have been described above, it should be understood that they have been presented by way of example only, and not limitation. Where methods and steps described above indicate certain events occurring in certain order, those of ordinary skill in the art having the benefit of this disclosure would recognize that the ordering of certain steps may be modified and such modification are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

For example, although various embodiments have been described as having particular features and/or combination of components, other embodiments are possible having any combination or sub-combination of any features and/or components from any of the embodiments described herein. For example, although some embodiments of the electrochemical cells were described as being prismatic, in other embodiments, the electrochemical cells can be curved, bent, wavy, or have any other shape. In addition, the specific configurations of the various components can also be varied. For example, the size and specific shape of the various components can be different than the embodiments shown, while still providing the functions as described herein.

The invention claimed is:

1. An electrochemical cell stack, comprising:
a first positive current collector having a first surface and a second surface;
a first electrode disposed on the first surface of the first positive current collector;
a second positive current collector disposed on the second surface of the first current collector, the second positive current collector contacting a majority of the second surface of the first current collector;
a first negative current collector having a first surface and a second surface;
a second electrode disposed on the first surface of the first negative current collector;
a second negative current collector disposed on the second surface of the first negative current collector;
a first separator disposed between the first electrode and the second electrode,
wherein at least one of the first electrode and the second electrode includes a semi-solid electrode;
a third electrode disposed on a first surface of the second positive current collector, a second surface of the second positive current collector coupled to the second surface of the first positive current collector;
a fourth electrode disposed on a first surface of the second negative current collector, a second surface of the second negative current collector coupled to the second surface of the first negative current collector;
a third positive current collector and a fifth electrode disposed on a first surface of the third positive current collector; and
a second separator disposed between the first surface of the third positive current collector and the first surface of the second negative current collector, the second separator separate from the first separator.

2. The electrochemical cell stack of claim 1, further comprising:
a third negative current collector and a sixth electrode disposed on a first surface of the third negative current collector.

3. The electrochemical cell stack of claim 2, further comprising:
a third separator disposed between of the first surface of the third negative current collector and the first surface of the second positive current collector, the third separator separate from the first separator and the second separator.

4. The electrochemical cell stack of claim 1, wherein the second surface of the second current collector is coupled to the second surface of the first current collector via a spacer.

5. The electrochemical cell stack of claim 1, further comprising:
a frame disposed around an outside edge of the semi-solid electrode.

6. An electrochemical cell stack, comprising:
a first positive current collector having a first surface and a second surface;
a semi-solid cathode disposed on the first surface of the first positive current collector;
a second positive current collector disposed on the second surface of the first current collector;
a first negative current collector having a first surface and a second surface;
an anode disposed on the first surface of the first negative current collector;
a second negative current collector disposed on the second surface of the first negative current collector, the second negative current collector contacting a majority of the second surface of the first negative current collector;
a first separator disposed between the first surface of the first positive current collector and the first surface of the first negative current collector;
a semi-solid cathode disposed on a first surface of the second positive current collector, a second surface of the second positive current collector coupled to the second surface of the first positive current collector;
an anode disposed on a first surface of the second negative current collector;
a third positive current collector and a semi-solid cathode disposed on a first surface of the third positive current collector, a second surface of the second negative current collector coupled to the second surface of the first negative current collector; and
a second separator disposed between the first surface of the third positive current collector and the first surface of the second negative current collector, the second separator separate from the first separator.

7. The electrochemical cell stack of claim 6, further comprising:
a third negative current collector and an anode disposed on a first surface of the third negative current collector.

8. The electrochemical cell stack of claim 7, further comprising:
a third separator disposed between of the first surface of the third negative current collector and the first surface of the second positive current collector.

9. The electrochemical cell stack of claim 6, wherein the second surface of the second current collector is coupled to the second surface of the first current collector via a spacer.

10. The electrochemical cell stack of claim 6, further comprising:
a frame disposed around an outside edge of the semi-solid cathode.

11. An electrochemical cell stack, comprising:
a first positive current collector having a first surface and a second surface;
a cathode disposed on the first surface of the first positive current collector;
a second positive current collector disposed on the second surface of the first positive current collector, the second positive current collector contacting a majority of the second surface of the first positive current collector;
a first negative current collector having a first surface and a second surface;
a semi-solid anode disposed on the first surface of the negative current collector;
a second negative current collector disposed on the second surface of the first negative current collector, the second negative current collector contacting a majority of the second surface of the first negative current collector;
a first separator disposed between the first surface of the first positive current collector and the first surface of the first negative current collector;
a cathode disposed on a first surface of the second positive current collector;
a semi-solid anode disposed on a first surface of the second negative current collector;
a third positive current collector and a cathode disposed on a first surface of the third positive current collector; and
a second separator disposed between the first surface of the third positive current collector and the first surface of the second negative current collector, the second separator separate from the first separator.

12. The electrochemical cell stack of claim 11, further comprising:
a third separator disposed between the first surface of the third positive current collector and the first surface of the second negative current collector, the third separator separate from the first separator and the second separator.

13. The electrochemical cell stack of claim 12, further comprising:
a third negative current collector and a semi-solid anode disposed on a first surface of the third negative current collector.

14. The electrochemical cell stack of claim 11, further comprising:
a frame disposed around an outside edge of the semi-solid anode.

15. The electrochemical cell stack of claim 11, wherein the second surface of the second current collector is coupled to the second surface of the first current collector via a spacer.

* * * * *